United States Patent
Kita

(10) Patent No.: US 8,611,605 B2
(45) Date of Patent: Dec. 17, 2013

(54) IMAGE PICK-UP APPARATUS HAVING A FUNCTION OF RECOGNIZING A FACE AND METHOD OF CONTROLLING THE APPARATUS

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/493,679

(22) Filed: Jun. 11, 2012

(65) Prior Publication Data

US 2012/0243752 A1 Sep. 27, 2012

Related U.S. Application Data

(62) Division of application No. 12/193,279, filed on Aug. 18, 2008, now Pat. No. 8,218,815.

(30) Foreign Application Priority Data

Aug. 31, 2007 (JP) ................................ 2007-225922

(51) Int. Cl.
*G06K 9/00* (2006.01)

(52) U.S. Cl.
USPC .................... 382/103; 382/282; 348/222.1

(58) Field of Classification Search
USPC ............ 382/103, 118, 254, 255, 282; 348/77, 348/143, 222.1
See application file for complete search history.

(56) References Cited

U.S. PATENT DOCUMENTS

| 7,639,281 | B2 | 12/2009 | Sudo | ........................ 348/222.1 |
| 2005/0276481 | A1 | 12/2005 | Enomoto | ..................... 382/190 |
| 2007/0211918 | A1 | 9/2007 | Kawada | ........................ 382/103 |
| 2008/0002862 | A1 | 1/2008 | Matsugu et al. | ............... 382/115 |
| 2008/0279427 | A1 | 11/2008 | Takagi | ........................ 382/118 |
| 2008/0285817 | A1 | 11/2008 | Imamura | ..................... 382/118 |
| 2009/0167883 | A1 * | 7/2009 | Nozaki | ..................... 348/222.1 |

FOREIGN PATENT DOCUMENTS

| CN | 1629717 A | 6/2005 | ............. G03B 15/05 |
| CN | 1648935 A | 8/2005 | ............... G06K 9/00 |
| JP | 9-259271 A | 10/1997 | ............... G06T 7/00 |
| JP | 2000-163600 A | 6/2000 | ............... G06T 9/20 |
| JP | 2006-228061 A | 8/2006 | ............... G06T 7/20 |
| JP | 2007-011970 A | 1/2007 | ............... G06T 1/00 |
| JP | 2007-81991 A | 3/2007 | ............. H04N 5/232 |
| JP | 2007-150604 A | 6/2007 | ............. H04N 5/225 |
| WO | WO 2007/113937 A1 * | 10/2007 | ............. H04N 5/225 |

OTHER PUBLICATIONS

Japanese Office Action dated Jan. 6, 2012 (and English translation thereof), issued in counterpart Japanese Application No. 2007-225922.

Chinese Office Action dated Jun. 17, 2010 (and English translation thereof), issued in counterpart Chinese Application No. 200810214907.2.

* cited by examiner

*Primary Examiner* — Andrew W Johns

(74) *Attorney, Agent, or Firm* — Holtz, Holtz, Goodman & Chick, PC

(57) ABSTRACT

It is judged whether or not a human face detecting mode is set. When it is determined that the human face detecting mode is set, a two-dimensional face detecting process is performed to detect a human face. When it is determined that a human face has not been detected in the two-dimensional face detecting process, a three-dimensional face detecting process is performed to detect a human face. In addition, when an animal face detecting mode is set, a three-dimensional face detecting process is performed to detect a face of an animal corresponding to the set detecting mode.

11 Claims, 11 Drawing Sheets

FIG. 2

| DIMENSION OF FACE DATA \ SORTS OF OBJECT | PERSONS | ANIMALS | | | ... |
|---|---|---|---|---|---|
| | | DOGS | CATS | HORSE | ... |
| TWO-DIMENSION | ... | NO | NO | NO | ... |
| THREE-DIMENSION | ... | ... | ... | ... | ... |

FIG. 7
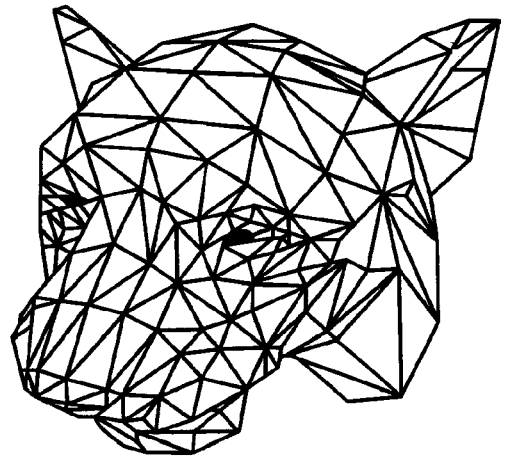
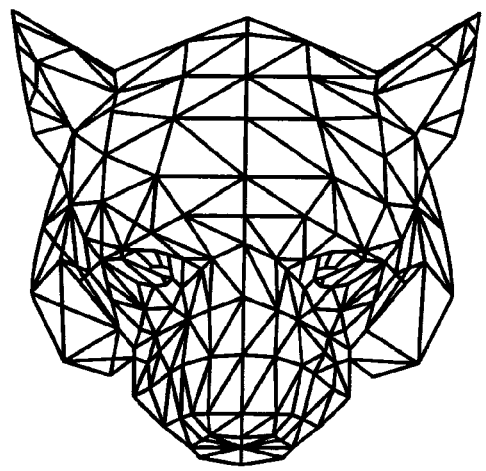
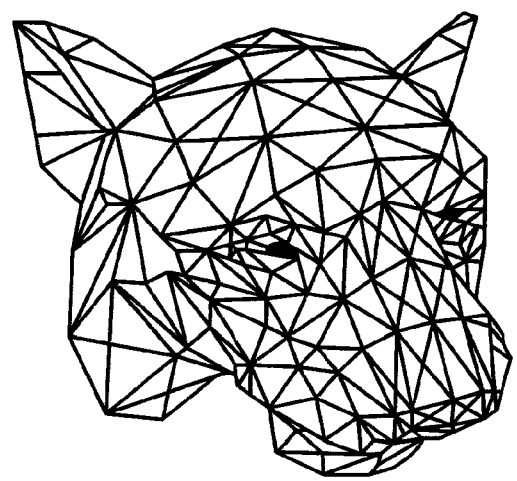

great a US 8,611,605 B2

IMAGE PICK-UP APPARATUS HAVING A FUNCTION OF RECOGNIZING A FACE AND METHOD OF CONTROLLING THE APPARATUS

CROSS REFERENCE TO RELATED APPLICATIONS

This is a Divisional of U.S. application Ser. No. 12/193,279, filed Aug. 18, 2008, now U.S. Pat. No. 8,218,815 the entire contents of which are incorporated herein by reference.

BACKGROUND OF THE INVENTION

1. Field of the Invention

The present invention relates to an image pick-up apparatus having a function of recognizing a face and a method of controlling the image pick-up apparatus.

2. Description of the Related Art

In the field of current image pick-up apparatuses such as electronic digital cameras, a technique has been developed, that recognizes a face of an object to be shot. And further, this face recognizing technique is adopted in the digital camera to focus on the recognized face of the object and/or to adjust exposure conditions bringing the recognized face of the object under appropriate exposure (refer to JP 2007-081991 A).

However, in the conventional face recognizing technique, only a face of a person can be recognized who is shot from the front or from a specified shooting angle, but a face of a person wearing sunglasses or a profile of the person cannot be recognized. Faces of animals such as a dog and cat other than a person cannot be recognized.

SUMMARY OF THE INVENTION

According to one aspect of the invention, there is provided an image pick-up apparatus having a function of recognizing an object, which comprises an image pick-up unit for shooting an object to obtain image data of the object, a face recognizing mode setting unit having plural face recognizing modes, in which face recognizing processes of different contents are performed respectively to recognize a face of the object, and for setting one of the plural face recognizing modes, and a face recognizing unit for, when a face recognizing mode is set by the face recognizing mode setting unit, performing a face recognizing process corresponding to the set face recognizing mode on the image data of the object obtained by the image pick-up unit, thereby recognizing a face in the image data of the object.

According to another aspect of the invention, there is provided a method of controlling an image pick-up apparatus having a function of recognizing an object, which method comprises setting one of plural face recognizing modes, in which face recognizing processes of different contents are performed respectively to recognize a face of the object, shooting an object to obtain image data of the object, performing a face recognizing process corresponding to the set face recognizing mode on the obtained image data of the object, and judging based on the performed face recognizing process, whether or not a face has been found in the obtained image data of the object or what is a sort of a face.

BRIEF DESCRIPTION OF THE DRAWINGS

FIG. 2 is a view showing a face data table recorded in a memory 12.

FIG. 7 is a view illustrating produced three-dimensional heads of an object (dog) expressed in polygons.

DETAILED DESCRIPTION OF THE PREFERRED EMBODIMENT

Now, preferred embodiments of an image pick-up apparatus i.e. an electronic digital camera according to the present invention will be described in detail with reference to the accompanying drawings.

First Embodiment of the Invention

A. Configuration of Digital Camera

Figure 1:
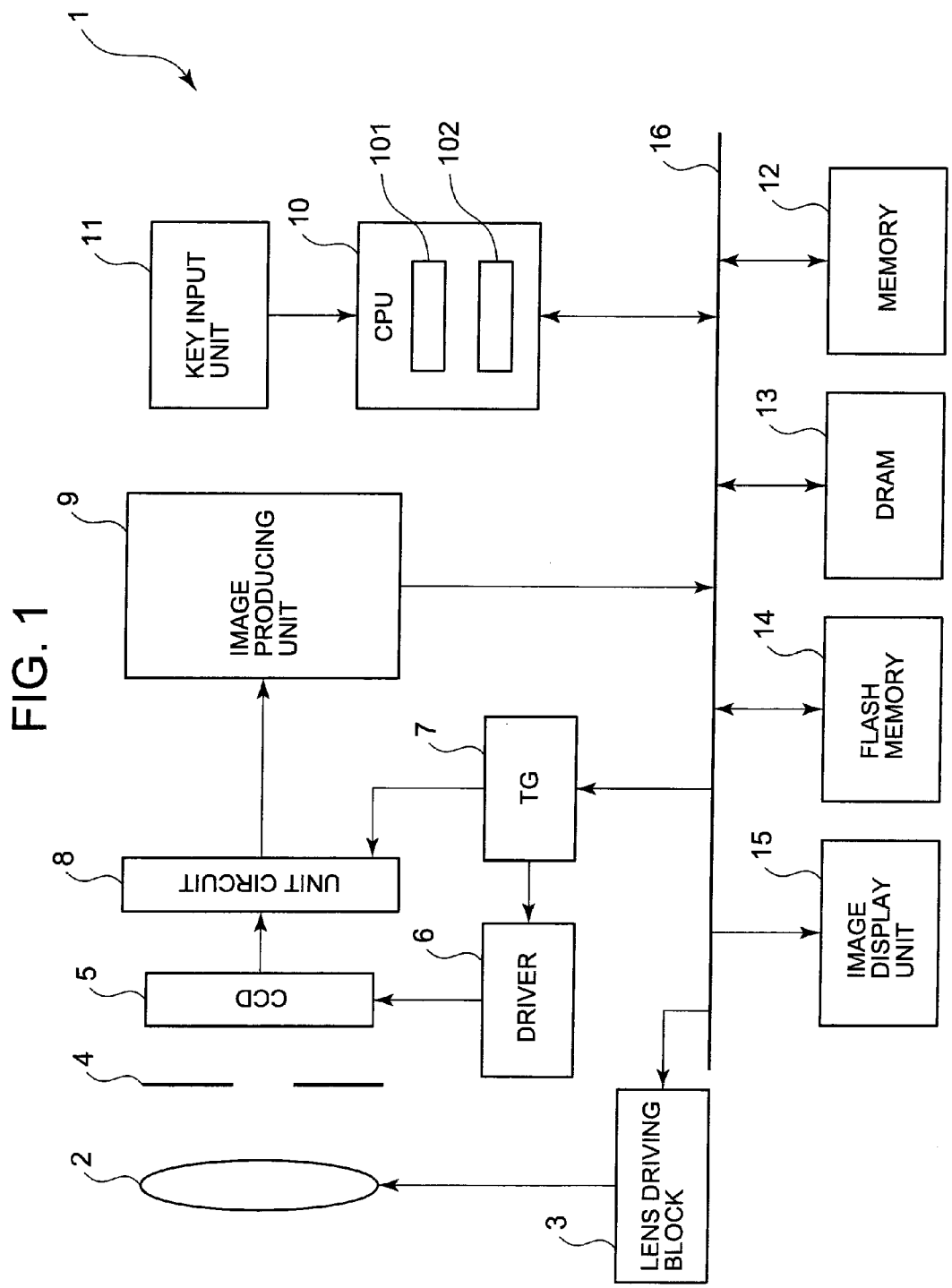
FIG. 1 is a block diagram showing a circuit configuration of a digital camera 1 according to embodiments of the invention.

FIG. 1 is a block diagram illustrating a circuit configuration of a digital camera 1 embodying the present invention.

The digital camera 1 comprises an image pick-up lens 2, lens driving block 3, aperture mechanism 4, CCD 5, driver 6, TG (Timing signal Generator) 7, unit circuit 8, image producing unit 9, CPU 10, key input unit 11, memory 12, DRAM 13, flash memory 14, image display unit 15 and data bus 16.

The image pick-up lens 2 includes a focus lens and zoom lens, consisting of a group of plural lens (not shown). The image pick-up lens 2 is connected with the lens driving block 3. Further, the lens driving block 3 comprises a focus motor (not shown) for moving the focus lens along an optical axis of the focus lens, and a zoom motor (not sown) for moving the zoom lens along an optical axis of the zoom lens, and further a focus motor driver (not shown) and zoom motor driver (not shown). The focus motor driver and zoom motor driver drive the focus motor and zoom motor respectively in accordance with control signals sent from CPU 10.

The aperture mechanism 4 includes a drive circuit (not shown) and the drive circuit operates an aperture mechanism in accordance with a control signal sent from CPU 10. The aperture mechanism 4 works to adjust light volume incoming through the image pick-up lens 2.

CCD 5 is driven by the driver 6, and photoelectrically converts light intensity of each color of RGB values of an object into an image pick-up signal, supplying the same signal to the unit circuit 8. Operation timings of the driver 6 and unit circuit 8 are controlled by CPU 10 in accordance with a timing signal from the TG 7. CCD is provided with a color filter of Bayer arrangement, and also has a function of an electronic shutter. The shutter speed of the electronic shutter is controlled by CPU 10 in accordance with a timing signal from the TG 7.

The unit circuit 8 is connected with TG 7, and has CDS (Correlated Double Sampling) circuit, AGC (Automatic Gain control) circuit and A/D converter. CDS circuit performs Correlated Double Sampling process on the image pick-up signal output from CCD 5. The sampled image pick-up signal is amplified by AGC circuit and supplied to A/D converter. A/D converter converts the sampled image into a digital signal. The image pick-up signal output from CCD 5 is converted into the digital signal in the unit circuit 8 and supplied to the image producing unit 9.

The image producing unit 9 performs a gamma correction process and white balance process on image data supplied from the unit circuit 8, hereby generating a luminance color-difference signal (YUV data). Image data of the generated luminance color-difference signal is recorded in DRAM 13 (buffer memory). In other words, the image producing unit 9 performs an imaging process on the image data output from CCD 5.

CPU 10 comprises one chip micro-computer which controls operation of the whole part of the digital camera 1, and has plural functions including a function of controlling an image pick-up operation of CCD 5, function of performing a compression/expansion process of image data, function of performing a recording process of image data into the flash memory 14, and function of performing a displaying process of image data. Further, CPU 10 includes a clock circuit and has a timer function.

In particular, CPU 10 includes a face-detecting mode setting unit 101 for setting one of plural sorts of face detecting modes and a face recognizing unit 102 for recognizing a face in image data. The face-detecting mode setting unit 101 has a recording area for recording a sort of the face-detecting mode to be set. Only the sort of the face-detecting mode set last is recorded in the recording area.

The face recognizing unit 102 has a function of recognizing a face using only two-dimension data (two-dimension face recognizing process) and a function of recognizing a face using three-dimension data (three-dimension face recognizing process). A face recognizing operation is to detect a face in the image data and/or to concretely discriminate who is the face in image data. In short, the face detecting operation and face discriminating operation are collectively referred to as the face recognizing operation.

The key input unit 11 includes plural keys, such as a shutter button, mode switching key, cross key, SET key, object following ON/OFF key. The shutter key can be pressed half way or full way. The key input unit 11 outputs a manipulation signal to CPU 10 in response to user's manipulation on the key input unit 11.

The memory 12 stores a control program necessary for controlling operation of the whole part in the digital camera 1, and necessary data (face data table in which face data of each of objects (human, dog, cat etc.) is set). CPU 10 operates in accordance with the control program. The memory 12 comprises a re-writable non-volatile memory.

FIG. 2 is a view showing the face data table recorded in the memory 12.

As shown in FIG. 2, objects are roughly classified into persons and animals. Further, the animals are separated into dogs, cats, horses etc. Face data of each object is recorded in the table. There are prepared two sorts of face data, that is, two dimension data and three dimension data. Two dimension face data and/or three dimension face data are prepared for each sort of object. Each human object has two-dimensional face data and three-dimensional face data. Each animal object has three dimension face data only and has no two-dimensional face data, because an animal face is stereoscopic and greatly changes depending on a viewing angle.

DRAM 13 is used as a flash memory for temporarily storing image data produced by CCD 5 and also used as a work area for CPU 10.

The flash memory 14 is a recording medium for storing compressed image data.

The image display unit 15 includes a color LCD and a driving circuit for driving the color LCD. The image display unit 15 displays a through image of an object produced by CCD 5 in a shooting stand-by state and displays a recorded image which is read from the flash memory 14 and expanded in a recorded image reproducing state.

B. Operation of the Digital Camera 1

Operation of the digital camera 1 according to the first embodiment of the invention will be described with reference to flow charts shown in FIGS. 3 and 4.

When a face-detecting still image shooting mode is set by user's manipulation of the mode switching key, CPU 10 displays a list of plural sorts of face detecting modes on the image display unit 15 at step SS1.

The plural sorts of face detecting modes are roughly classified into a human face detecting mode for detecting a human face and an animal face detecting mode for detecting a face of an animal (dog, cat, horse etc.). Further, the animal face detecting mode is separated by animals into a dog face detecting mode, cat face detecting mode horse face detecting mode etc. In short, plural sorts of face detecting modes are prepared for each sort of object to be shot. A list of these face detecting modes are displayed on the image display unit 15. A desired face detecting mode is selected by moving a cursor thereon.

CPU 10 judges at step S2 which face detecting mode has been selected among the plural face detecting modes displayed on the image display mode 15. The judgment is made depending on whether or not a manipulation signal corresponding to manipulation of SET key has been sent from the key input unit. 11. The user can move the cursor onto his or her desired sort of face detecting mode on the image display unit 15 by manipulating the cross key, and select the sort of face detecting mode with the cursor displayed thereon in an overlapping manner by manipulating SET key.

When a face detecting mode has been selected at step S2 (YES at step S2), the face detecting mode setting unit 101 in CPU 10 sets at step S3 the face detecting mode on which the cursor is displayed in an overlapping manner, when SET key is manipulated.

When the face detecting mode has been set at step S3, CPU 10 advances to step S4, where CPU 10 starts a through image displaying process, wherein an object is shot at a predetermined frame rate and image data successively are generated by CCD 5 and processed by the image producing unit 9, whereby frame image data (YUV data) of brightness color difference signals is produced and stored in the buffer memory (DRAM 15) and images are successively displayed based on the frame image data on the image display unit 15.

CPU 10 judges at step S5 whether or not the object following ON/OFF key has been manipulated. When it is determined at step S5 that the object following ON/OFF key has been manipulated (YES at step S5), CPU 10 judges at step S6 whether or not the current object following mode has been set ON. When it is determined at step S6 that the current object following mode has not been set ON, that is, that the current object following mode has not been set OFF (NO at step S6), CPU 10 advances to step S7, where the object following mode is switched from OFF to ON, and further advances to step S9.

Meanwhile, when it is determined at step S6 that the current object following mode has been set ON, CPU 10 advances to step S8, where the object following mode is switched from ON to OFF, and further advances to step S9.

When it is determined at step S5 that the object following ON/OFF key has not been manipulated (NO at step S5), CPU 10 advances to step S9.

CPU 10 judges at step S9 whether or not the user has pressed the shutter button half way. The judgment is made depending on whether or not a manipulation signal corresponding to user's manipulation to press the shutter button half way is sent from the key input unit 11.

The user determines a picture composition so as to include an object (main object) to be shot within a field angle, and then presses the shutter button, instructing a shooting preparation.

When it is determined at step S9 that the shutter button has not been pressed half way (NO at step S9), CPU 10 returns to step S5. When it is determined at step S9 that the shutter button has been pressed half way (YES at step S9), CPU 10 advances to step S10, where the face recognizing unit 102 of CPU 10 performs an appropriate face detecting process in the face detecting mode set at step S3. The face detecting process will be described in detail later. An appropriate face is detected in the face detecting process in the face detecting mode set at step S3. For example, in the case where the human face detecting mode is set, a human face is detected in the face detecting process, and in the case where the horse face detecting mode is set, a horse face is detected in the face detecting process.

After performing the face detecting process, CPU 10 advances to step S11, where it is judged whether or not the current object following mode is set ON.

When it is determined at step S11 that the current object following mode is not set ON, that is, that the current object following mode is set OFF (NO at step S11), CPU 10 advances to step S12 to judge whether or not a face has been detected in the face detecting process.

When it is determined at step S12 that a face has been detected in the face detecting process (YES at step S12), CPU 10 advances to step S13 to perform AF process on the detected face using a contrast detection method, and further advances to step S15. Since the contrast detection method is well known technique, a detailed description thereof will be omitted. The contrast detection method brings a focus lens to a lens position where a high frequency component of image data within an area to be focused on is maximum, thereby focusing on an image within the area to be focused on.

Meanwhile, when it is determined at step S12 that a face has not been detected in the face detecting process (NO at step S12), CPU 10 advances to step S14 to perform AF process on data in a predetermined area (for example, a central area in the field angle) using the contrast detection method, and further advances to step S15. AF process using the contrast detection method is performed at steps S13 and S14, but AF process using a phase difference method may be performed in place of using the contrast detection method. In short, it is only required in the present digital camera 1 that AF process is performed on the area to be focused on.

CPU 10 judges at step S15 whether or not the shutter button has been pressed full way. The judgment is made depending on whether or not a manipulation signal corresponding to user's manipulation to press the shutter button full way is sent from the key input unit 11. When it is determined at step S15 that the shutter button has not been pressed full way (NO at step S15), CPU 10 repeatedly judges at step S15 whether or not the shutter button has been pressed full way until the shutter button is pressed full way. When the shutter button is pressed full way (YES at step S16), CPU 10 advances to step S16 to perform a still image shooting process. Still image data obtained in the still image shooting process is compressed and recorded in the flash memory 14.

Figure 4:
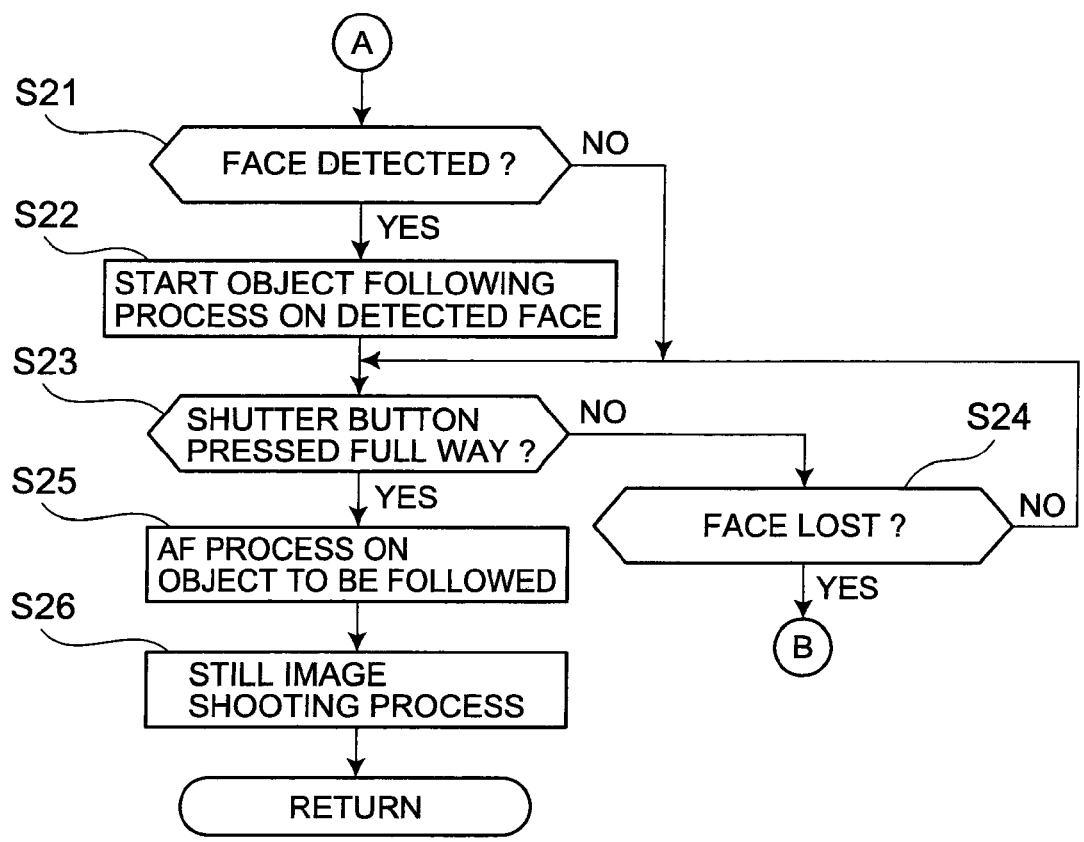
FIG. 4 is a flow chart showing operation of the digital camera 1 according to the first embodiment of the invention.

Meanwhile, when it is determined at step S11 that the current object following mode is set ON (YES at step S11), CPU 10 advances to step S21 in FIG. 4 to judge whether or not a face has been detected in the face detecting process performed at step S10.

When it is determined at step S21 that a face has been detected (YES at step S21), CPU 10 advances to step S22, where the face recognizing unit 102 of CPU 10 two-dimensionally detects the face detected at step S21 and starts the object following process to follow the detected face, and then advances to step S23. Two-dimensional detection of a face is to detect a face using only two-dimensional data. In the two-dimensional face detecting process at step S22, feature data is extracted from the two-dimensional image detected at step S10 and registered and a face having the registered feature data is detected using a block matching method, wherein the two-dimensional image is detected in an image within a face area in the face detecting process at step S10. The block matching method is a well known technique, and therefore no detailed description will be given. The block matching method uses two sheets of image data and detects an area of image data having the closest correlationship with other image data in an area.

When it is determined at step S21 that a face has not been detected (NO at step S21), CPU 10 advances to step S23.

CPU 23 judges at step S23 whether or not the shutter button has been presses full way.

When it is determined at step S23 that the shutter button has not been presses full way (NO at step S23), CPU 10 advances to step S24 to judge whether or not a target face has been lost. In other words, CPU 10 judges whether or not a face has not been detected in the two-dimensional face detecting process at step S22. When it is determined at step S21 that a face has not been detected (NO at step S21), that is, when the face to be originally followed has not been detected in the face detecting process at step S10, it is determined that the target face has been lost.

Figure 3:
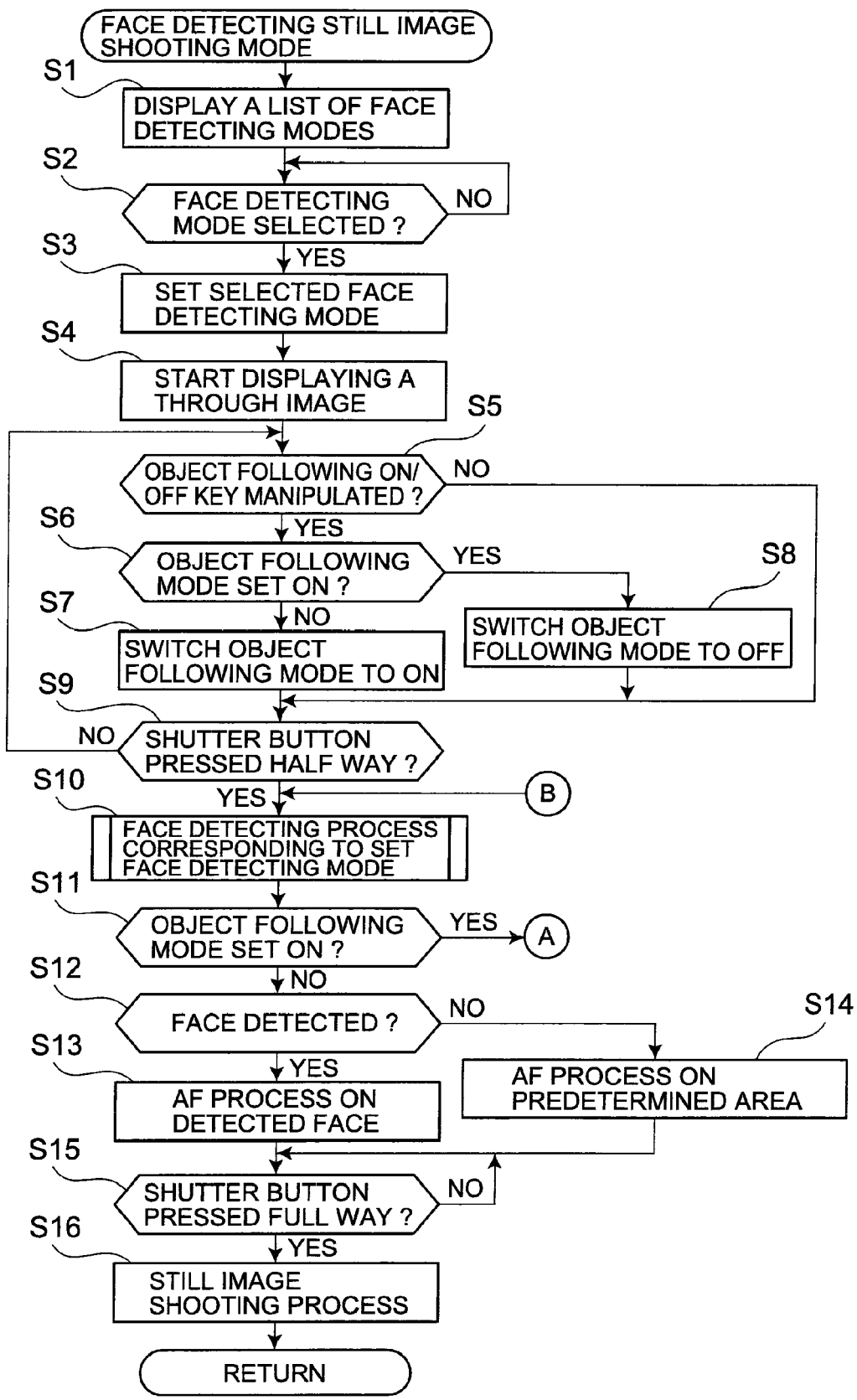
FIG. 3 is a flow chart showing operation of the digital camera 1 according to the first embodiment of the invention.

When it is determined at step S24 that the target face has not been lost, CPU 10 returns to step S23, and when it is determined at step S24 that the target face has been lost, CPU 10 returns to step S10 in FIG. 3. Therefore, when the target face has been lost, the face detecting process is performed in the face detecting mode set at step S3.

Meanwhile, when it is determined at step S23 that the shutter button has been presses full way (YES at step S23), CPU 10 advances to step S25 to perform AF process on the face to be followed using the contrast detection method. In other words, AF process is performed on the face that is two-dimensionally detected just before the shutter button is pressed.

CPU 10 performs a still image shooting process on the still image data obtained in the shooting process to compress and record the same data in the flash memory 14.

C. Face Detecting Process in the Set Face Detecting Mode

The face detecting process in the set face detecting mode, that is, the face detecting process corresponding to the sort of the set face detecting mode will be described in accordance with a flow chart of FIG. 5.

Figure 5:
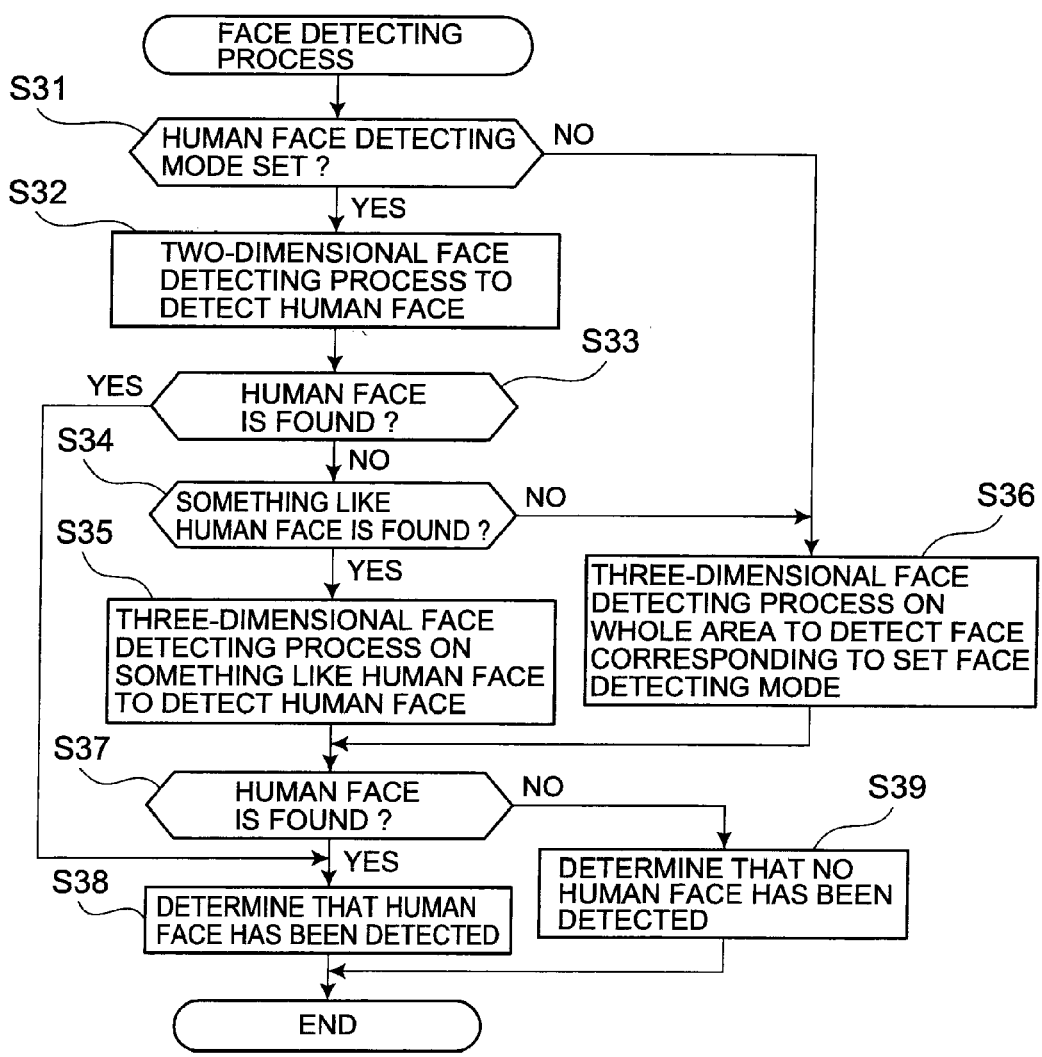
FIG. 5 is a flow chart showing operation in a face detecting process in a face detecting mode set currently.

CPU 10 advances from step S10 in FIG. 3 to step S31 in FIG. 5, where the face recognizing unit 102 of CPU 10 judges whether or not the human face detecting mode has been set.

When it is determined at step S31 that the human face detecting mode has been set (YES at step S31), CPU 10 advances to step S32, where the face recognizing unit 102 of CPU 10 performs the two-dimensional face detecting process to detect a human face. In the two-dimensional face detecting process, feature data (two-dimensional feature data) of the whole object is calculated from frame image data obtained last and the calculated feature data of the object is compared with two-dimensional human face data set in the face data table shown in FIG. 2 to detect a position of the human face in the frame image data.

The whole object means all the objects to be shot by CCD 5. For instance, when a person standing in front of a building is shot, the whole object includes the person and the building. In short, feature data of the object is calculated from all the area of image data.

For example, in the case where the whole object including a building and a person standing in front of the building is shot, plural features are extracted from the building and person, and coordinates and relative positions of the extracted features are quantified into data. This data is the feature data of the whole object. While these features are being extracted, plural features of a face are extracted from contours of eye, nose and mouth. The feature data of the whole object is data quantified based on plural features of not only the face but all the shot objects. Comparison of the extracted feature data of the whole object with the face data registered in the face data table is made to judge whether or not there is any feature data which coincides with the face data. Comparison of the extracted feature data of the whole object with face data of each portion of a face is made to calculate similarity with respect to each portion of a face.

The face recognizing unit 102 of CPU 10 judges at step S33 whether or not a human face can be found in the image. That is, the face recognizing unit 102 judges whether or not a human face could have been detected in the two-dimensional face detecting process. In other words, it is judged whether or not any portion that is similar to face data of the face data table to a predetermined extent (or within a predetermined extent) can be found in the calculated feature data of the whole object.

When it is determined at step S33 that a human face has been found in the image (YES at step S33), CPU 10 advances to step S38, where the face recognizing unit 102 of CPU 10 determines that a face has been detected.

Meanwhile, when it is determined at step S33 that a human face has not been found in the image (NO at step S33), CPU 10 advances to step S34, where the face recognizing unit 102 of CPU 10 judges whether or not anything like a face has been found in the image. Something like a face is data of a face generated when a mouth, nose and only one eye are detected in the image with other eye lost (when a profile is shot), or when a mouth and nose are detected with both eyes lost (when a person wearing sun glasses is shot), or when only eyes are detected with the mouth and nose lost (when a person wearing a mask is shot). In short, something like a face is data of a face generated when a portion of a face has not been found.

When it is determined at step S34 that something like a face has been found (YES at step S34), CPU 10 advances to step S35, where the face recognizing unit 102 of CPU 10 performs the three-dimensional face detecting process on the image in the area where something like a face has been found, thereby detecting a human face, and further advances to step 37. The three-dimensional face detecting process will be described in detail later. The above process reduces a process load in the three-dimensional face detecting process.

Meanwhile, when it is determined at step S31 that the human face detecting mode has not been set (NO at step S31), or when it is determined at step S34 that something like a face has not been found (NO at step S34), CPU 10 advances to step S36, where the face recognizing unit 102 of CPU 10 performs the three-dimensional face detecting process on the whole area of the frame image data, thereby detecting a face in the currently set face detecting mode, and further advances to step S37. When it is determined at step S34 that something like a face has not been found (NO at step S34), and CPU 10 advances to step S36, the three-dimensional face detecting process is performed on the whole area of the frame image data, thereby detecting a face at step S36.

At step S37, the face recognizing unit 102 of CPU 10 judges whether or not a human face has been found in the image. In other words, it is judged whether or not a human face has been found in the three-dimensional face detecting process.

When it is determined at step S37 that a human face has been found in the image (YES at step S37), CPU 10 advances to step S38, where the face recognizing unit 102 determines that a face has been detected. When it is determined at step S37 that a human face has not been found in the image (NO at step S37), CPU 10 advances to step S39, where the face recognizing unit 102 determines that a face has not been detected.

When the face recognizing unit 102 determines at step S38 that a face has been detected, it is determined at step S12 in FIG. 3 and at step S21 in FIG. 4 that a face has been detected. When the face recognizing unit 102 determines at step S39 that a face has not been detected, it is determined at step S12 in FIG. 3 and at step S21 in FIG. 4 that a face has not been detected.

D. Three-Dimensional Face Detecting Process

Now, the three-dimensional face detecting operation will be described. In the two-dimensional face detecting process, a face is two-dimensionally detected. In other words, two-dimensional feature data of the object generated based on the shot frame image data is compared with the two-dimensional face data stored in the face data table (FIG. 2), whereby a face is detected in the frame image data. But the three-dimensional face detecting process uses three-dimensional data to detect a face.

Two samples of operation for detecting a face using three-dimensional data will be described, but the face detecting operation adopted in the digital camera 1 is not limited to these samples of the operation. Any operation for detecting a face of an object using three-dimensional data may be adopted in the digital camera 1.

D-1. First Three-Dimensional Face Detecting Process

Three-dimensional face detecting process will be described in accordance with a flow chart shown in FIG. 6. The three-dimensional face detecting process is performed at steps S35 and S36, and details of which process are described in accordance with the flow chart of FIG. 6. The face recognizing unit 102 of CPU 10 displays on the image display unit 15 an instruction of shooting the main object at different shooting angles at step S51 in FIG. 6. For instance, an instruction of "shoot the object at another shooting angle" is displayed on the image display unit 15. Then, the user shoots the object at different shooting angles in accordance with the instruction. It is preferable to change the shooting angle with the face (main object) kept at the same position in an image to be shot.

The face recognizing unit 102 of CPU 10 judges at step S52 whether or not a predetermined time (for instance, one second) has passed after the instruction of shooting the main object at different shooting angles was displayed. Meanwhile, CPU 10 records in the buffer memory plural sheets of frame images for displaying a through image.

The face recognizing unit 102 of CPU 10 repeatedly judges at step S52 whether or not a predetermined time has passed until it is determined that the predetermined time has passed. When it is determined at step S52 that the predetermined time has passed (YES at step S52), CPU 10 advances to step S53, where the face recognizing unit 102 of CPU 10 calculates feature data from each of plural pieces of obtained frame image data.

In the three-dimensional face detecting process at step S36 in FIG. 5, feature data of the object (feature data of the whole object) is calculated based on the whole area of the obtained frame image data.

In the three-dimensional face detecting process at step S35 in FIG. 5, feature data of the object is calculated based on the image data in the area, which data is selected from plural pieces of frame image data and is determined to include something like a face.

The feature data of the whole object calculated based on the frame image data is described. For example, in the case where the whole object includes a building and a person standing in front of the building is shot, plural features are extracted from the building and person, and coordinates and relative positions of the extracted features are quantified into data. This data is the feature data of the whole object. While these features are being extracted, plural features of a face are extracted from contours of eye, nose and mouth. In short, the feature data of the whole object is data quantified based on plural features of not only the face but all the shot objects.

The feature data of something like a face is data quantified based on feature data of all the shot objects within an area which is determined to include something like a face.

In the present embodiment, a position and size of the area which is determined to include something like a face are kept same in all the frame image data, but the following technique may be adopted. That is, the two-dimensional face detecting process is repeatedly performed on each piece of frame image data until a predetermined time passes, hereby detecting an area in each piece of frame image data which includes something like a face, and feature data (feature data of an object like a face) is calculated based on image data in the detected area of each piece of frame image data. In this technique, when a face is detected using the two-dimensional face detecting process, CPU 10 can advance from step S33 to step S38 in FIG. 5.

When feature data of an object has been calculated based on each piece of fame image data, CPU 10 advances to step S54, where the face recognizing unit 102 of CPU 10 produces a three-dimensional model of the object based on the calculated feature data of each piece of frame image data.

Since a technique of producing a three-dimensional model is a well known technique, no detailed description is given. A three-dimensional model is produced using a triangulation system based on featuring points of an image and featuring points of another image corresponding to the former.

FIG. 7 is a view showing samples of produced three-dimensional models (surface model) of an object (a head of an animal of a cat family) represented in a polygon display (triangle polygon display). The object may be represented by a wire frame model or solid model in place of the surface model.

The face recognizing unit 102 of CPU 10 compares at step S55 the produced three-dimensional model of the object with three-dimensional face data which is prepared for the sort of the face detecting mode set currently and stored in the face data table of FIG. 2.

For instance, in the process at step S35 in FIG. 5, the produced three-dimensional model of the object is compared with the three-dimensional face data of a person recorded in the face data table of FIG. 2. And in the process at step S36 in FIG. 5, when a dog face detecting mode is set, the produced three-dimensional model of the object is compared with the three-dimensional face data of a dog recorded in the face data table of FIG. 2.

The above comparison process is performed to judge whether or not any portion which coincides with the three-dimensional face data of the face data table is found in the produced three-dimensional model of the object. The comparison process is performed with respect to various portions of the object, thereby obtaining degrees of similarity of various portions.

The face recognizing unit 102 of CPU 10 judges at step S56 whether or not any portion which coincides with the three-dimensional face data in the face data table with a larger degree of similarity is found in the produced three-dimensional model of the object. In other words, it is judged whether or not any portion is found in the produced three-dimensional model of the object, which portion coincides with the three-dimensional face data of the face data table with a degree of similarity within a predetermined range. The portion (coinciding portion) which coincides with the three-dimensional face data may be a portion of the three-dimensional model of the object or the whole portion of the three-dimensional model of the object. Point is that it can be judged whether any coinciding portion is found in the produced three-dimensional model of the object, which portion coincides with the three-dimensional face data with a degree of similarity larger than a predetermined value.

In the process at step S56, when it is determined that a portion (coinciding portion) is found in the produced three-dimensional model of the object, which portion coincides with the three-dimensional face data with a degree of similarity larger than a predetermined value (YES at step S56), CPU 10 advances to step S57, where the face recognizing unit 102 of CPU 10 determines that the coinciding portion of the produced three-dimensional model of the object is a face, which portion coincides with the three-dimensional face data with a degree of similarity larger than a predetermined value, and sets as a face area an area of the obtained frame image data corresponding to the coinciding portion which coincides with the three-dimensional face data with a degree of similarity larger than a predetermined value is a face. In short, the face recognizing unit 102 of CPU 10 detects the face area of the frame image data.

The area of the obtained frame image data corresponding to the coinciding portion which coincides with the three-dimensional face data with a degree of similarity larger than a predetermined value is an area of the frame image data corresponding to feature data of the coinciding portion (face portion) of the three-dimensional model of the object which is coincided with the three-dimensional face data. Since plural models of the object are produced based on the plural pieces of frame image data, there are plural pieces of frame image data corresponding to the feature data. Therefore, the area of the frame image data corresponding to the coinciding portion may be an area of the frame image data obtained last among plural pieces of frame image data or an area consisting of areas of all the plural pieces of frame image data, wherein each piece of frame image data corresponds to the coinciding portion with a degree of similarity larger than a predetermined value and the three-dimensional model of the object is produced based on the frame image data.

Meanwhile, when it is determined at step S56 that the coinciding portion with a degree of similarity larger than a predetermined value is not found in the produced three-dimensional model of the object (NO at step S56), CPU 10 advances to step S58, where the face recognizing unit 102 of CPU 10 determines that a face has not been found in the plural pieces of obtained frame image data.

When the face area has been detected at step S57, it is determined that the a face has been detected at steps S38 in FIG. 5, S12 in FIG. 3 and S21 in FIG. 4. When it is determined at step S58 that a face has not been found, it is determined that a face has not been detected at steps S12 in FIG. 3 and S21 in FIG. 4.

As described above, the first face detecting process produces a three-dimensional model of the object based in the plural pieces of frame image data obtained by shooting the same object, and compares the produced three-dimensional model with the three-dimensional face data to detect a face. As the result, the face is detected at an enhanced accuracy.

For example, when a profile of a person is shot, or when a person wearing sun glasses is shot, his or her face can be detected without failure.

Further, since the three-dimensional face data is compared with the produced three-dimensional model, not only a human face but a face of an animal (dog, cat etc) can be detected. A face of a horse seems extremely different when the horse is seen at a different viewing angle. But three-dimensional model of the horse is produced and therefore, the face of the horse can be detected at a high accuracy.

D-2. Second Three-Dimensional Face Detecting Process

The second three-dimensional face detecting operation will be described with reference to a flow chart shown in FIG. 8.

When the three-dimensional face detecting process is performed to detect a face at step S35 or at step S36, the face recognizing unit 102 of CPU 10 presumes that an object faces the front at step S61.

The face recognizing unit 102 of CPU 10 reads from the face date table shown in FIG. 2 three-dimensional face data prepared for the sort of the face detecting mode set currently, and produces a two-dimensional image data of a face of the object seen from the angle of the face set currently, based on the three-dimensional face data read from the face data table (rendering process). Currently it is presumed that the object faces the front, and therefore two-dimensional face data of the face seen from the front is produced in the face detecting mode set currently. A technique that produces two-dimensional image data from three-dimensional image data is well known and therefore a detailed description thereof will not be given. Two-dimensional image data is produced from three-dimensional image data by removing hidden surfaces and/or hidden lines.

For example, when the human face detecting mode is set, three-dimensional human face data for the human face detecting mode set currently is read from the face data table of FIG. 2, and two-dimensional image data of a person seen from the angle set currently is produced using the read three-dimensional human face data. When the cat face detecting mode is set, three-dimensional cat face data for the cat face detecting mode set currently is read from the face data table of FIG. 2, and two-dimensional image data of a cat seen from the angle set currently is produced using the read three-dimensional cat face data.

The face recognizing unit 102 of CPU 10 calculates feature data of a face from the produced two-dimensional image data of a face at step S63, whereby the feature data of a face seen from the angle of the face set currently is calculated for the face detecting mode set currently.

Further, the face recognizing unit 102 of CPU 10 calculates feature data of an object from frame image data obtained last for displaying a current through image at step S64.

In the three-dimensional face detecting mode set at step S36 in FIG. 5, feature data of an object (feature data of the whole object) is calculated from the whole area of the obtained frame image data.

In the three-dimensional face detecting mode set at step S35 in FIG. 5, feature data of an object (feature data of something like a face) is calculated from image data in an area where something like a face is found in the obtained frame image data.

The face recognizing unit 102 of CPU 10 compares at step S66 the feature data of a face calculated at step S63 with the feature data of an object calculated at step S64, judging whether or not any portion which coincides with the feature data of a face is found in the feature data of an object. In the comparison process, various portions of the feature data of an object are successively compared with the feature data of a face to calculate a degree of similarity.

The face recognizing unit 102 of CPU 10 judges at step S66 whether or not any portion is found in the feature data of an object, which portion coincides with the feature data of a face calculated at step S63 with a degree of similarity larger than a predetermined value. In other words, it is judged whether or not any portion (coinciding portion) which coincides with the feature data of a face with a degree of similarity within a predetermined range is found in the feature data of an object. The coinciding portion may be a portion of the feature data of an object or the whole portion of the feature data of an object. Point is that it can be judged whether any coinciding portion is found in the feature data of an object, which portion coincides with the feature data of face with a degree of similarity larger than a predetermined value.

When it is determined at step S66 that the coinciding portion which coincides with the feature data of a face with a degree of similarity larger than a predetermined value is found in the feature data of an object (YES at step S66), CPU 10 advances to step S67, where the face recognizing unit 102 of CPU 10 determines that the coinciding portion of the feature data of an object with a degree of similarity larger than a predetermined value is a portion corresponding to a face, and sets an area of the frame image data corresponding to the coinciding portion as a face area, wherein the feature data is produced from the frame image data. In short, the face recognizing unit 102 of CPU 10 detects the face area of the frame image data.

When it is determined at step S66 that the coinciding portion which coincides with the feature data of a face with a degree of similarity larger than a predetermined value is not found in the feature data of an object (NO at step S66), CPU 10 advances to step S68, where the face recognizing unit 102 of CPU 10 judges whether or not the angle of the face set currently is the last angle. In other words, it is judged whether or not all the angles of the face have been set as previously determined.

When it is determined at step S68 that the angle of the face set currently is not the last angle (NO at step S68), CPU 10 advances to step S69, where the face recognizing unit 102 of CPU 10 sets the angle of the face to the following angle, and further advances to step S62. The "following angle" is an angle of the object which is turned about an imaginary standard line from the current angle by 5 degrees in the rightward or leftward. The imaginary standard line is a line passing through the top of the head of the object and the jaw or the throat of the object. The head of the object may be moved to turn the imaginary standard line in the vertical plane, or the head of the object may be moved to turn the imaginary standard line in the vertical plane and turned about the imaginary line in the rightward or leftward.

Meanwhile, when it is determined at step S68 that the angle of the face set currently is the last angle (YES at step S68), CPU 10 advances to step S70, where the face recognizing unit 102 of CPU 10 determines that a face is not found in the frame image data.

When the face area has been detected at step S67, the face recognizing unit 102 of CPU 10 determines that a face has been detected at step S38 in FIG. 5, at S12 in FIG. 3 and at step S21 in FIG. 4. When it is determined at step S70 that no face has been found, the face recognizing unit 102 of CPU 10 determines that no face has been detected at step S39 in FIG. 5, at S12 in FIG. 3 and at step S21 in FIG. 4.

As described above, in the second three-dimensional face detecting process, two-dimensional image data of a face of the object seen from the different angle is produced from the three-dimensional face data previously stored in the face data table, and feature data of the object is calculated from the produced two-dimensional image data, and then the feature data of the object calculated from the produced two-dimensional image data and the feature data of the object calculated from one sheet of obtained frame image data are compared to detect a face of the object. Therefore, the accuracy of detecting a face is enhanced.

For example, even if the object is an animal such as a dog and cat, or when the object turns aside, the face of the object can be detected without failure. In the second three-dimensional face detecting process, there is no need to produce a three-dimensional model of the object from plural pieces of obtained frame image data, which is required in the first three-dimensional face detecting process, and therefore a process load is reduced.

At first, it is presumed that the object faces the front (step S61) and then the face of the object is set to turn until the face of the object is detected (step S69). But there is no need to set the object to face the front. Point is that the angle of the face can be changed until the face is detected.

As described above, since the face detecting process is performed depending on the sort of the face detecting mode currently set by the user in the first embodiment of the invention, a face detecting process appropriate for the sort of the object and shooting conditions is performed, thereby enhancing accuracy of a face recognition.

Further, in the first embodiment of the invention, since the two-dimensional face detecting process and/or three-dimensional face detecting process are performed depending on the sort of the face detecting mode currently set by the user, the accuracy of a face recognition is enhanced without performing an unnecessary three-dimensional face detecting process of a heavy process load. For example, since a human face is somewhat planar, the two-dimensional face detecting process is performed to detect a human face. In general, an animal such as a dog has a three-dimensional face, it is hard to detect the face of a dog using the two-dimensional face detecting process. Therefore, the three-dimensional face detecting process is used to detect the face of a dog.

When a human face cannot be detected using the two-dimensional face detecting process, the three-dimensional face detecting process is performed. Even if a person is facing aside or wears a mask or sunglasses, the human face of the person can be detected without failure using the three-dimensional face detecting process.

Further, the user sets the face detecting mode corresponding to the sort of the object, only a face of the object can be detected, which the user wants to detect the face.

When the object following mode is set ON, the two-dimensional face detecting process and/or three-dimensional face detecting process are performed to detect a face, depending on the sort of the face detecting mode set by the user. When the face is detected, the two-dimensional face detecting process is performed to detect the face. When the face to be followed is lost, the two-dimensional face detecting process and/or three-dimensional face detecting process are performed again, depending on the sort of the face detecting mode set by the user, reducing process load in the face following process, and the accuracy of face following operation is enhanced.

Second Embodiment of the Invention

Now, the second embodiment of the invention will be described.

In the first embodiment of the invention, the face detecting mode of the sort selected by the user is set. But in the second embodiment of the invention, a face detecting mode is automatically set.

E. Operation of Digital Camera 1

The digital camera 1 having the same circuit configuration as the first embodiment shown in FIG. 1 is used in the second embodiment of the invention.

Operation of the digital camera 1 in the second embodiment will be described with reference to flow charts in FIGS. 9 and 10.

When the face-detecting still image shooting mode is set by user's manipulation of the mode switching key, the face detecting mode setting unit 101 of the CPU 10 sets the human face detecting mode at step S101.

CPU 10 makes CCD 5 start the shooting operation to display a through image at step S102.

CPU 10 judges at step S103 whether or not the object following ON/OFF key has been manipulated.

When it is determined at step S103 that the object following ON/OFF key has been manipulated (YES at step S103), CPU 10 advances to step S104 to judged whether or not the current object following mode is ON.

When it is determined at step S104 that the current object following mode is not ON, that is, the current object following mode is OFF (NO at step S104), CPU 10 advances to step S105 to switch the object following mode from OFF to ON, and further advances to step S107.

Meanwhile, it is determined at step S104 that the current object following mode is ON (YES at step S104), CPU 10 advances to step S106 to switch the object following mode from ON to OFF, and further advances to step S107.

When it is determined at step S103 that the object following NO/OFF key has not been manipulated, CPU 10 advances directly to step S107.

CPU 10 judges at step S107 whether or not the shutter button has been pressed half way by the user.

When it is determined at step S107 that the shutter button has not been pressed half way (NO at step S107), CPU 10 returns to step S103.

When it is determined at step S107 that the shutter button has been pressed half way (YES at step S107), CPU 10 advances to step S108, where the face recognizing unit 102 of CPU 10 performs the face detecting process corresponding to the sort of the face detecting mode set currently.

At step S108, the same operation as at step S10 of FIG. 3 (operation shown in FIG. 5) in the first embodiment is performed. In the face detecting process, a face corresponding to the sort of the face detecting mode set currently is detected. Since the human face detecting mode was set at step S101, a human face is detected in the face detecting process.

After performing the face detecting process, CPU 10 advances to step S109 to judges whether or not a face has been detected in the face detecting process.

When it is determined at step S109 that no face has been detected (No at step S101), CPU 10 advances to step S110 to judge whether or not there is left any face detecting mode which has not yet been set by the face detecting mode setting unit 101.

When it is determined at step S110 that there is left a face detecting mode which has not yet been set by the face detecting mode setting unit 101 (YES at step S110), CPU 10 advances to step S111, where the face detecting mode setting unit 101 of the CPU 10 sets the face detecting mode which has not yet been set, and returns to step S108.

At step S111, the face detecting mode setting unit 101 of the CPU 10 sets the a face detecting mode such as the animal (dog or cat) face detecting mode other than the human face detecting mode which was set at step S101.

Meanwhile, when it is determined at step S109 that a face has been detected (YES at step S109), CPU 10 advances to step S112 to judge whether of not the object following mode is set ON.

When it is determined at step S112 that the object following mode is not set ON, that is, the object following mode is set OFF (NO at step S112), CPU 10 advances to step S112 to perform AF process on the detected face using a contrast detection system, and then advances to step S115.

Meanwhile, when it is determined at step S110 that there is left no face detecting mode which has not yet been set by the face detecting mode setting unit 101 (NO at step S110), CPU 10 advances to step S114 to perform AF process on a predetermined area using a contrast detection system, and then advances to step S115.

CPU 10 judges at step S115 whether or not the shutter button has been pressed full way.

When it is determined at step S115 that the shutter button has not been pressed full way (NO at step S115), CPU 10 repeatedly judges at step S115 whether or not the shutter button has been pressed full way, until the shutter button is pressed full way.

When it is determined at step S115 that the shutter button has been pressed full way (YES at step S115), CPU 10 advances to step S116 to perform the still image shooting process to obtain still image data. Further, CPU 10 compresses the obtained still image data and records the data in the flash memory 14.

Figure 10:
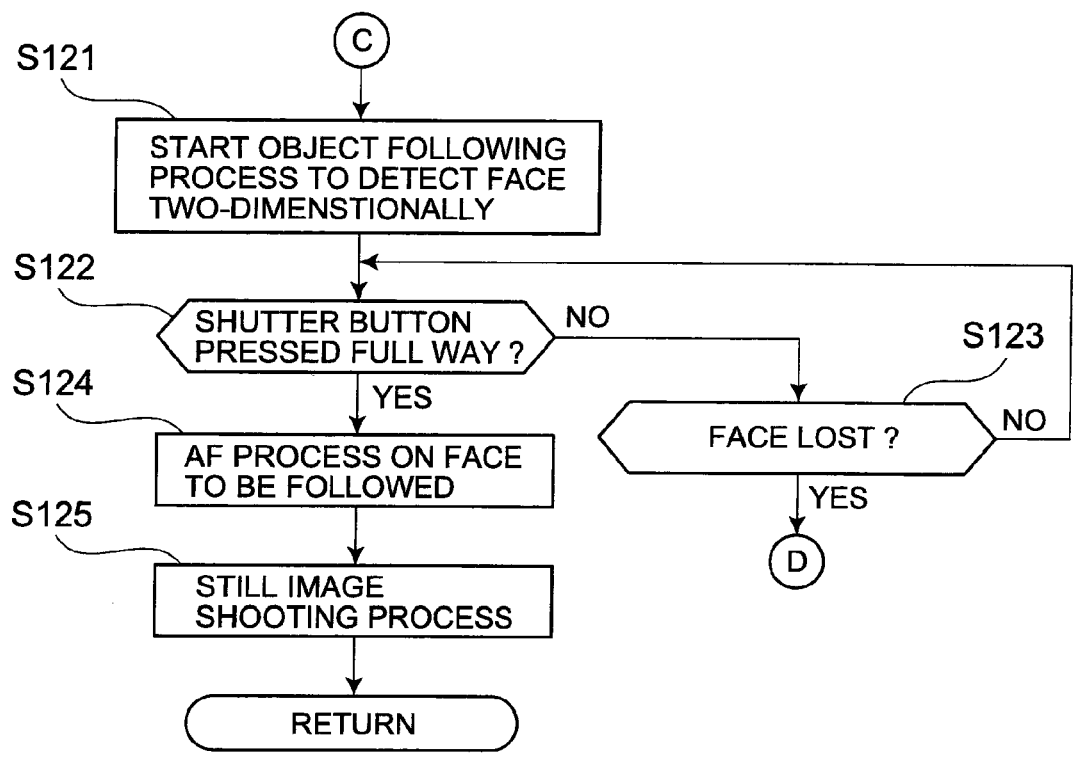
FIG. 10 is a flow chart showing operation of the digital camera 1 according to the second embodiment of the invention.

When it is determined at step S112 that the object following mode is set ON (YES at step S112), CPU 10 advances to step S121 in FIG. 10, where the face recognizing unit 102 of CPU 10 two-dimensionally detects the detect face, thereby starting the object following process to follow the detected face. The two-dimensionally detecting process detects a face using only two-dimensional data. The two-dimensionally detecting process at step S121 means to detect the detected face using a block matching system.

CPU 10 judges at step S122 whether or not the shutter button has been pressed full way by the user. When it is determined at step S122 that the shutter button has not been pressed full way (NO at step S122), CPU 10 advances to step S123 to judge whether or not the face to be followed (target face) is lost. That is, it is judged whether or not the face could not have been detected in the two-dimensional face detecting process.

Figure 9:
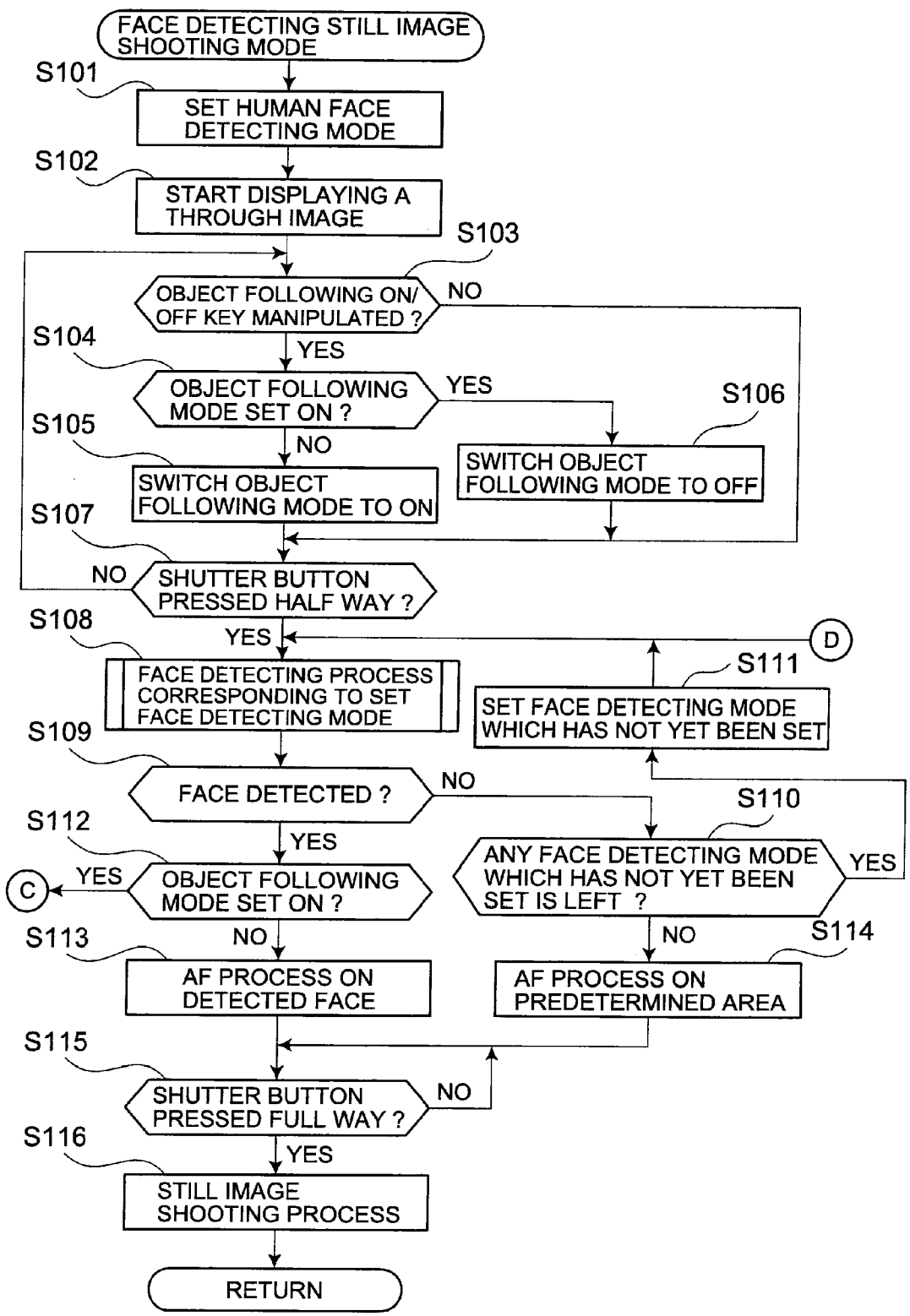
FIG. 9 is a flow chart showing operation of the digital camera 1 according to the second embodiment of the invention.

When it is determined at step S123 that the face to be followed is not lost (NO at step S123), CPU 10 returns to step S122, and when it is determined at step S123 that the face to be followed (target face) is lost (YES at step S123), CPU 10 returns to step S108 in FIG. 9. When the face is lost, the face detecting process corresponding to the sort of the face detecting mode set currently is performed again.

Meanwhile, when it is determined at step S122 that the shutter button has been pressed full way (YES at step S122), CPU 10 advances to step S124 to perform the AF process on the face to be followed (target face) using the contrast detection system. In other words, AF process is performed on the face which has been two-dimensionally detected just before the shutter button is pressed full way.

Then, CPU 10 performs the still image shooting process on the obtained still image data at step S125 to compressed the data and stores the compressed still image data in the flash memory 14.

As described above, in the second embodiment of the invention, since the face detecting mode is automatically set, the user is not required to execute a troublesome manipulation. Even if it is not clear for the user what object (dog or cat) he or she shot, he face of the object can be detected without failure, and accuracy of detecting the face is enhanced.

The two-dimensional face detecting process or the three-dimensional face detecting process is performed depending on the sort of the face detecting mode set currently, and therefore an unnecessary three-dimensional face detecting process of a heavy process load is not performed and the accuracy of detecting a face is enhanced. For example, since a human face is somewhat planar, the two-dimensional face detecting process is performed to detect a human face. In general, an animal such as a dog has a three-dimensional face, it is hard to detect a face of a dog using the two-dimensional face detecting process. Therefore, the three-dimensional face detecting process is used to detect the face of a dog.

When a human face cannot be detected in the two-dimensional face detecting process, then the three-dimensional face detecting process is performed. Therefore, even if a person is facing aside or wears a mask or sunglasses, the human face can be detected without failure using the three-dimensional face detecting process.

When the object following mode is set ON, the two-dimensional face detecting process and/or three-dimensional face detecting process are performed depending on the sort of the face detecting mode set by the user, thereby detecting a face. When the face is detected, the two-dimensional face detecting process is performed to detect the face. When the face to be followed is lost, the two-dimensional face detecting process and/or three-dimensional face detecting process are performed again, depending on the sort of the face detecting mode set by the user, reducing a process load in the face following process, and the accuracy of face following operation is enhanced.

When the face-detecting still image shooting mode is set, the human face detecting mode is set at first (step S101), but other face detecting mode may be set in place of the human face detecting mode.

Further, modification may be made to the second embodiment, such that at first the user sets a face detecting mode, and when a face could not be detected in the set face detecting mode, other face detecting mode is automatically set.

Third Embodiment of the Invention

The third embodiment of the invention will be described.

In the first and second embodiments, the face detecting process detects only a face. But in the third embodiment, a face detection is adopted in a face discrimination to specifically discriminate who is shot, or what is shot.

The face detecting process can detect a face but cannot tell whose face is detected, and further the face detecting process can detect an animal's face (for example, cat face), but cannot tell the sort of the animal (cat). There are many species of cat such as Persian cat and calico cat. But the same species of cat has a delicately different head or face. The face detecting process detects a human face or a face of an animal other than those (friend, child, pet etc.) the user wants to detect or focus on.

The face discrimination judges whether or not a face (human face) of a person or a face of an animal (animal face) previously recorded is found in an obtained frame image data.

The user is allowed to register a face of a person and/or face of an animal in a register mode. When three-dimensional face data is registered, the three-dimensional face is produced from plural pieces of frame image data, wherein the plural pieces of frame image data are obtained by shooting the same object (face) several times at different shooting angles. When a two-dimensional face data is registered, feature data of a face (face feature data) calculated form an obtained frame image data is registered.

Three-dimensional face data and two-dimensional face data to be registered must have data volume to the extent that tells whose face is detected and/or what species of cat or dog is detected, not to the extent that roughly tells the detected face is a human face or animal (dog, cat) face. Face data tables for face recognition like that shown in FIG. 2 are prepared with respect to all the species of objects.

With respect to a human face, both two-dimensional face data and three-dimensional face data are registered in the face data table. And with respect to an animal face, only three-dimensional face data is registered in the face data table. In the face data table for face recognition, plural pieces of face data for each species of objects can be registered. For example, two-dimensional face data and three-dimensional face data of plural persons are registered in the face data table and three-dimensional face data of plural cats are registered in the face data table.

The face detecting process adopted in a face discriminating process is performed in the substantially same manner as in the above embodiments of the invention. Only different operation will be described.

In the third embodiment, face discriminating modes are prepared in place of the face detecting modes of the first and second embodiments. The face discriminating modes are prepared for every species of the objects. For example, a human face discriminating mode, a dog face discriminating mode and a cat face discriminating mode are prepared.

F. Operation in Face-Discriminating Still Image Shooting Mode

F-1. Operation in the face-detecting still image shooting mode shown in FIGS. 3 and 4 is adopted in the face-discriminating still image shooting mode.

Operation in the face-discriminating still image shooting mode is performed in accordance with the flow charts of FIGS. 3 and 4. Only operation different from the face-detecting still image shooting mode will be described.

A list of plural sorts of face discriminating modes are displayed on the image display unit 15 at step S1. When it is determined at step S2 that a face discriminating mode has been selected (YES at step S2), the selected face discriminating mode is set at step S3. A face discriminating process corresponding to the set face discriminating mode is performed at step S10. It is judged at step S12 whether or not a face has been discriminated. When it is determined at step S12 that a face has been discriminated (YES at step S12), AF process is performed on the discriminated face at step S13. When it is determined at step S12 that a face has not been discriminated (NO at step S12), AF process is performed on a predetermined area at step S14. The face discriminating process corresponding to the set face discriminating mode will be described in detail later.

In the case of detecting a face in the face discriminating process, when it is determined that a face cannot be discriminated and that a face can be detected, AF process is performed on the detected face at step S12. When it is determined that a face cannot be discriminated and that a face cannot be detected, AF process may be performed on a predetermined area. The face detection in the face discriminating process will be described later.

It is judged at step S21 whether or not a face has been discriminated. When a face has not been discriminated, CPU 10 advances to step S23. When a face has been discriminated, CPU 10 advances to step S22 to start the object following process on the discriminated face, and further advances to step S23. As described in the first embodiment, the object following process two-dimensionally detects the discriminated face, thereby following the detected face.

F-2. Operation in the face-detecting still image shooting mode shown in FIGS. 9 and 10 is adopted in the face-discriminating still image shooting mode.

Operation in the face-discriminating still image shooting mode is performed in accordance with the flow charts of FIGS. 9 and 10. Only the operation different from the face-detecting still image shooting mode will be described.

A human face discriminating mode is set at step S101 in FIG. 9. The face discriminating process corresponding to the set face discriminating mode is performed at step S108. It is judged at step S109 whether or not a face has been discriminated. When it is determined at step S109 that a face has not been discriminated (NO at step S109), it is judged at step S110 whether or not there is left any face discriminating mode which has not yet been set. When it is determined at step S110 that there is left a face discriminating mode which has not yet been set, CPU 10 sets the face discriminating mode which has not been set at step S111, and returns to step S108. Further, when it is determined that a face has been discriminated at step S109 and that the object following mode is not ON at step S112, AF process is performed on the recognized face at step S113. Meanwhile, when it is determined at step S110 that there is left no face discriminating mode which has not yet been set, AF process is performed on a predetermined area at step S114. The face discriminating process corresponding to the set face discriminating mode will be described in detail later.

In the case of detecting a face in the face discriminating process, when it is determined at step S110 that there is left no face discriminating mode which has not yet been set, it is judged at step S110 whether or not a face has been detected. When a face has been detected, AF process is performed on the detected face. When a face has not been detected, CPU 10 advances to step S114 to perform AF process on a predetermined area. Face detection in the face discriminating process will be described later.

When it is determined at step S112 that the object following mode is set ON, CPU 10 advances to step 121 in FIG. 10 to start the object following process against the discriminated face. As described in the firth embodiment, the discriminated object is two-dimensionally detected, thereby following the detected face.

G. Face Discriminating Process Corresponding to the Face Discriminating Mode Set Currently

G-1. Face discriminating operation in the set face discriminating mode in accordance with the flow chart (FIG. 5) of the face detecting process in the set face detecting mode.

The face discriminating operation will be described in accordance with the flow chart shown in FIG. 5. Only the face discriminating operation different from the face detecting process will be described.

It is judged at step S31 whether or not the human face discriminating mode has been set. When the human face discriminating mode has been set, CPU 10 advances to step S32 to perform the two-dimensional face discriminating process to detect a human face. In the two-dimensional face discriminating process, two-dimensional feature data of the whole object is calculated from obtained frame image data, and the calculated feature data of the object is compared with two-dimensional human face data registered in the face data table for face recognition to judge whether or not the registered human face (simply, registered face) is found in the obtained frame image data.

It is judged at step S33 whether or not the registered human face has been discriminated in the two-dimensional face discriminating process. When it is determined at step S33 that a human face has been discriminated in the two-dimensional face recognizing process, CPU 10 advances to step S38 to determine that a face has been discriminated. Meanwhile, when it is determined at step S33 that a human face has not been discriminated, or when it is determined at step S31 that the human face discriminating mode has not been set, CPU 10 advances to step S36 to perform the three-dimensional face discriminating process on the whole area, thereby recognizing a face corresponding to the sort of the currently set face discriminating mode, and further advances to step S37.

It is judged at step S37 whether or not the registered face has been found in the three-dimensional discriminating process, that is, whether or not a face has been discriminated. When it is determined at step S37 that the registered face has been found in the obtained frame image data, CPU 10 determines at step S38 that a face has been discriminated. When it is determined at step S37 that the registered face has not been found in the obtained frame image data, CPU 10 determines at step S39 that a face has not been discriminated.

When it is determined at step S38 that a face has been discriminated, CPU 10 determines that a face has been discriminated at step S12 in FIG. 3, at step S21 in FIG. 4, and at step S109 in FIG. 9. When it is determined at step S39 that a face has not been discriminated, CPU 10 determines that a face has not been discriminated at step S12 in FIG. 3, at step S21 in FIG. 4, and at step S109 in FIG. 9. In this case, processes at steps S34 and S35 in FIG. 5 are not necessary.

G-2. Operation in a Face Discriminating Process Corresponding to a Face Discriminating Mode Set by Other Method The face discriminating operation will be described referring to a flow chart shown in FIG. 11. In the memory 12 is stored two-dimensional human face data for face detection in addition to the face data table for face discrimination.

Figure 11:
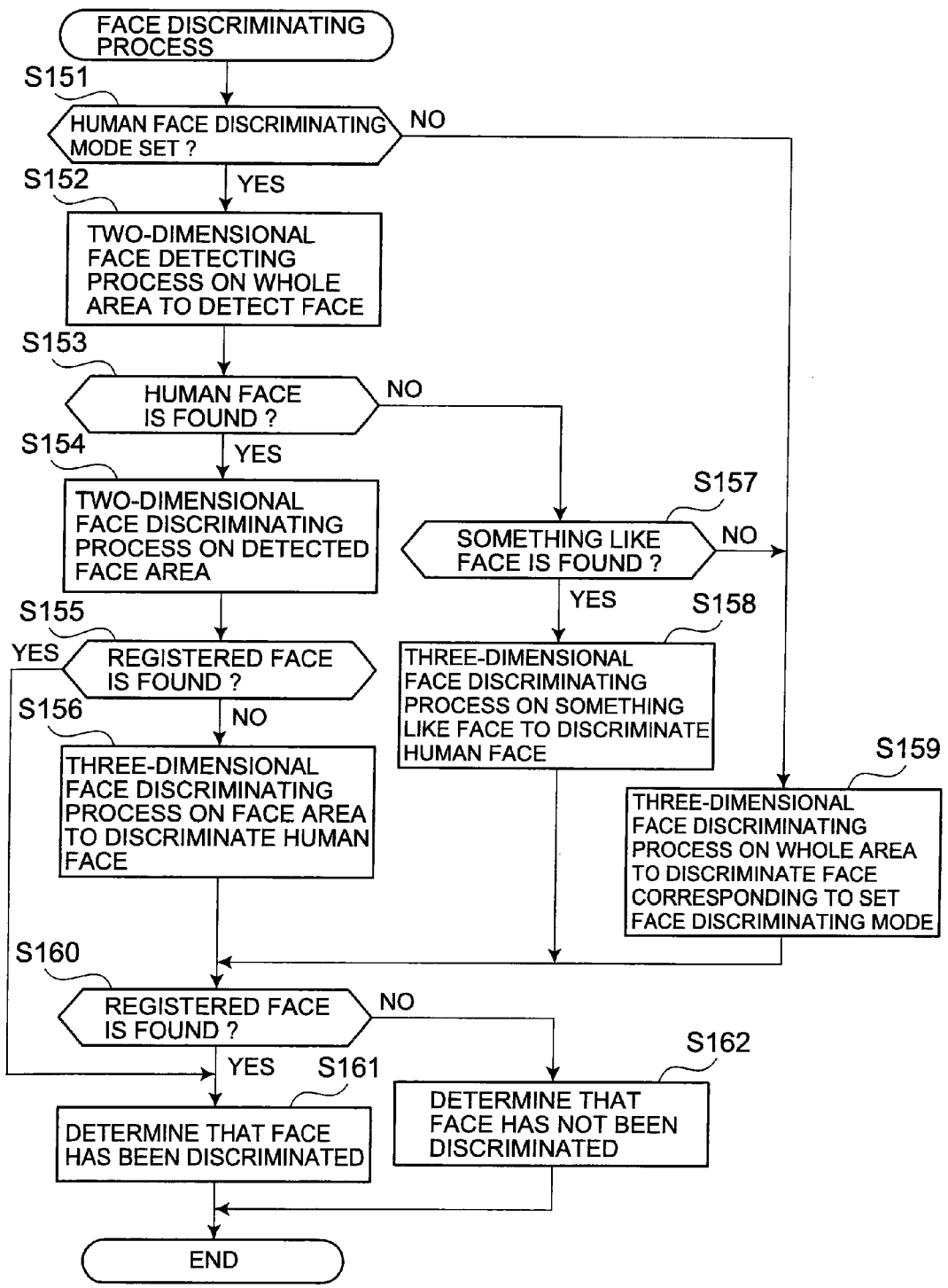
FIG. 11 is a flow chart showing operation in a face discriminating process in a face discriminating mode set currently.

CPU 10 judges at steps S10 in FIG. 3, S108 in FIG. 9 or at step S151 in FIG. 11, whether or not the human face discriminating mode has been set at present.

When it is determined at step S151 that the human face discriminating mode has been set (YES at step S151), CPU 10 advances to step S152, where the face recognizing unit 102 of the CPU 10 performs the two-dimensional face detecting process on the whole area of the obtained frame image data to detect a face.

The two-dimensional face detecting process calculates two-dimensional feature data of an object (two-dimensional feature data of the whole object) from the obtained frame image data, and compares the calculated feature data of an object with two-dimensional human face data prepared for human face detection and recorded in the memory 12, thereby detecting a human face in the image. Since the human face feature data stored in the memory 12 for detecting a human face is used only to judge if data is a human face, the human face feature data does not need information volume to the extent that can specifically tell whose face is the image. The calculated feature data of the whole object needs information volume only to the extent that can detect a human face.

The face recognizing unit 102 of the CPU 10 judges at step S153 whether or not a human face has been found in the image. In short, it is judged at step S153 whether or not a human face has been detected in the two-dimensional face detecting process. That is, it is judged whether or not there has been found any portion of the calculated feature data of the whole object that coincides with the face data with a degree of similarity larger than a predetermined value (within a predetermined range).

When it is determined at step S153 that a human face has been found in the image (YES at step S153), CPU 10 advances to step S154, where the face recognizing unit 102 of the CPU 10 performs the two-dimensional face discriminating process on the detected face area of the obtained frame image data. That is, the two-dimensional feature data (face feature data) of an object is calculated using image data within the detected face area of the obtained frame image data, and the calculated face feature data is compared with the two-dimensional human face data registered in the face data table prepared for face recognition, thereby judging whether or not the shot person is a person whose face data is registered in the face data table. The registered face data of the person has an information volume not to the extent that can roughly tell if the image is a human face but to the extent that can clearly tell whose face is the image. And the calculated feature data of an object (face feature data) has an information volume to the extent that can clearly tell whose face is the image.

Since the two-dimensional face discriminating process is performed on the detected face area of the obtained frame image data, the process load can be reduced and the accuracy of recognizing a face is improved.

The face recognizing unit 102 of the CPU 10 judges at step S155 whether or not a registered face has been found. That is, it is judged whether or not the registered face of the person has been discriminated in the two-dimensional face discriminating process.

When it is determined at step S155 that the registered face has been found (YES at step S155), CPU 10 advances to step S161, where the face recognizing unit 102 of the CPU 10 determines that a face has been discriminated.

Meanwhile, when it is determined at step S155 that the registered face has not been found (NO at step S155), CPU 10 advances to step S156, where the face recognizing unit 102 of the CPU 10 performs the three-dimensional face discriminating process on the detected face area of the obtained frame image data to discriminate a human face, and further advances to step S160. The three-dimensional face discriminating process will be described later.

Since the three-dimensional face discriminating process is performed on the detected face area of the obtained frame image data, the process load can be reduced and the accuracy of recognizing a face is improved.

Meanwhile, when it is determined at step S153 that a human face has not been found in the image (NO at step S153), CPU 10 advances to step S157 to judge whether or not something like a face is found in the image. As described in the first embodiment of the invention, something like a face is data of a face generated when a mouth, nose and only one eye are detected but other eye is not detected in the image (when a profile is shot) or when a mouth and nose are detected but one eye or both eyes are not detected in the image (when a person wearing sun glasses is shot), or when only eyes are detected but the mouth and nose are not detected in the image (when a person wearing a mask is shot). In short, something like a face is data of a face generated when at least a face part is not detected in the image.

When it is determined at step S157 that something like a face has been found in the image (YES at step S157), CPU 10 advances to step S158, where the face recognizing unit 102 of CPU 10 performs he three-dimensional face discriminating process on an area where something like a face is found to discriminate a human face, and then advances to step S160. Since the three-dimensional face discriminating process is performed on the area of something like a face, the process load can be reduced and the accuracy of recognizing a face is improved. The three-dimensional face discriminating process will be described later.

Meanwhile, when it is determined at step S157 that something like a face has not been found in the image (NO at step S157) or when it is determined at step S151 that the human face discriminating mode has not been set (NO at step S151), then CPU 10 advances to step S159 to perform the three-dimensional face discriminating process on the whole area of the obtained frame image data, thereby discriminating a face corresponding to the sort of the currently set face discriminating mode, and further advances to step S160. The three-dimensional face discriminating process will be described later.

The face recognizing unit 102 of the CPU 10 judges at step S160 whether or not the registered face has been found. That is, it is judged whether or not the face of the person whose face data is registered in the face data table has been discriminated in the three-dimensional face discriminating process.

When it is determined at step S160 that the registered face has been found (YES at step S160), it is determined at step S161 that the face of the person has been discriminated. When it is determined at step S160 that the registered face has not been found (NO at step S160), it is determined at step S162 that the face of the person has not been discriminated.

When it is determined at step S161 that the face of the person has been discriminated, it is determined that the face has been discriminated at step S12 in FIG. 3, at step S21 in FIG. 4 and at step S109 in FIG. 9. When it is determined at step S162 that the face of the person has not been discriminated, it is determined that a face has not been discriminated at step S12 in FIG. 3, at step S21 in FIG. 4 and at step S109 in FIG. 9.

In the case where the human face discriminating mode has been set, both the two-dimensional face detecting process and the three-dimensional face discriminating process are performed in the flow chart shown in FIG. 11. But in the case of detecting a human face in the human face discriminating process, modification may be made to the operation shown in FIG. 11 such that only the two-dimensional face discriminating process is performed without performing the two-dimensional face detecting process. In this case, when it is determined at step S151 that the human face discriminating mode has been set, CPU 10 advances directly to step S154 to perform the two-dimensional face discriminating process on the whole area of the obtained frame image data, and further advances to step S155. When it is determined at step S155 that the registered image has not been found, it is judged whether or not a face has been detected. When it is determined that a face has been detected in the two-dimensional face discriminating process, CPU 10 advances to step S156. When it is determined that a face has not been detected in the two-dimensional face discriminating process, CPU 10 advances to step S157. In this case, processes at steps S152 and S153 are omitted.

In the case where only the two-dimensional face discriminating process is performed to detect a human face, when the registered face has been found in frame image data, it is determined that a human face has been detected. Further, even if it is determined that the registered face has not been found in frame image data, two-dimensional feature data of the whole object is compared with the two-dimensional human face data registered in the face data table, whereby the registered human face cannot be detected but a human face can be detected. For example, when a portion of the obtained image data coincides with two-dimensional human face data registered in the face data table with a degree of similarity larger than a first value, it is determined that the image is a face of a person corresponding to the human face data registered in the face data table, and when a portion of the obtained image data does not coincide with two-dimensional human face data registered in the face data table with a degree of similarity larger than the first value, but coincides with two-dimensional human face data with a degree of similarity larger than a second value (the second value is smaller than the first value), it is determined that the image is a human face.

The face detecting operation in the three-dimensional face discriminating process will be described later.

H. Three-dimensional Face Discriminating Operation Performed in Accordance with the Flow Chart of the Three-Dimensional Face Detecting Process Shown in FIG. 6

H-1. The three-dimensional face discriminating process will be described, which is performed in accordance with the flow chart (FIG. 6) of the three-dimensional face detecting process. The three-dimensional face discriminating operation is performed in accordance with the flow chart shown in FIG. 6. Only the face discriminating operation different from the face detecting operation will be described.

Plural pieces of feature data are calculated from plural pieces of obtained frame image data respectively at step S53. The calculated feature data of an object has an information volume not to the extent that roughly tells the image is a face of a person, dog or cat, but to the extent that specifically tell whose face is the image.

In the face discriminating process at step S36 in FIG. 5 or in the three-dimensional face discriminating process at step S159 in FIG. 11, two-dimensional feature data of an object (feature data of the whole object) is calculated from the whole area of the obtained frame image data.

In the three-dimensional face discriminating process at step S156 in FIG. 11, two-dimensional feature data of an object (two-dimensional face feature data) is calculated from image data in the detected face area of each obtained frame image data. The face feature data is data quantified based on the feature data of the whole object obtained within the detected face area.

In the three-dimensional face discriminating process at step S158 in FIG. 11, two-dimensional feature data of an object is calculated from image data within an area of each obtained frame image data where it is determined something like face is found.

A three-dimensional model of an object is produced from feature data of each frame image data of an object at step S54, and the produced three-dimensional model of an object is compared with the three-dimensional face data prepared for the face discriminating mode and registered in the face data table for face discrimination at step S55.

It is judged at step S56 whether or not any portion which coincides with the three-dimensional face data of the face data table with a degree of similarity larger than a predetermined value is found in the produced three-dimensional model of an object. When a portion which coincides with the three-dimensional face data with a degree of similarity larger than a predetermined value is found in the produced three-dimensional model of an object (YES at step S57), CPU 10 advances to step S57 to determine that the registered face is found in the portion of the produced three-dimensional model of an object which coincides with the three-dimensional face data with a degree of similarity larger than a predetermined value, thereby detecting a face area. Meanwhile, when a portion which coincides with the three-dimensional face data with a degree of similarity larger than a predetermined value is not found in the produced three-dimensional model of an object (NO at step S57), CPU 10 advances to step S58 to determine that the registered face is not found in the produced three-dimensional model of an object.

When the face area has been detected at step S57, it is determined that a face has been discriminated at step S38 in FIG. 5, at step S161 in FIG. 11, at step S12 in FIG. 3, at step S21 in FIG. 4, and at step S109 in FIG. 9. When a face has not been found at step S58, it is determined that a face has not been discriminated at steps S39 in FIG. 5 and S162 in FIG. 11, and it is determined that a face has not been discriminated at steps S12 in FIG. 3, S21 in FIG. 4, and S109 in FIG. 9.

It is possible to detect a face in the three-dimensional face discriminating process. In the three-dimensional face discriminating process, when the registered face has been found in frame image data, it is determined that a face has been detected. Further, even if it is determined that the registered face has not been found in the frame image data, three-dimensional model of an object is compared with three-dimensional face data registered in the face data table, whereby a human face other than the registered human face can be detected. For example, when a portion of the obtained image data coincides with three-dimensional face data registered in the face data table with a degree of similarity larger than a first value, it is determined that the image is a face corresponding to the three-dimensional face data registered in the face data table, and when a portion of the obtained image does not coincide with three-dimensional face data with a degree of similarity larger than the first value, but coincides with three-dimensional face data with a degree of similarity larger than a second value (the second value is smaller than the first value), then it is determined that the image is a face.

H-2. A three-dimensional face discriminating operation will be described, which is performed in accordance with the flow chart (FIG. 8) of the three-dimensional face detecting process. The three-dimensional face discriminating operation is performed in accordance with the flow chart shown in FIG. 8. Only the face discriminating operation different from the face detecting operation will be described.

Two-dimensional face data of an object seen from the currently set angle is produced using the three-dimensional face data prepared for the face discriminating mode set currently at step S62, wherein the above three-dimensional face data prepared for the face discriminating mode set currently is selected from among three-dimensional face data of each object registered in the face data table for face discrimination.

And two-dimensional face feature data is calculated from the produced two-dimensional face data of an object. The calculated face feature data has an information volume not to the extent that roughly tells the image is a face of a person, dog or cat, but to the extent that specifically tells whose face is the image.

Two-dimensional feature data of an object is calculated from the frame image data shot last at step S64. The calculated face feature data of an object has an information volume not to the extent that roughly tells the image is a face of a person, dog or cat, but to the extent that specifically tells whose face is the image.

In the three-dimensional face discriminating process at step S159 performed in accordance with the flow chart of the face detecting process shown in FIG. 11 (step S36 in FIG. 5), two-dimensional feature data of an object (feature data of the whole object) is calculated from the whole area of the obtained frame image data.

In the three-dimensional face discriminating process at step S156 in FIG. 11, two-dimensional feature data of an object (two-dimensional face feature data) is calculated from image data in the detected face area of the obtained frame image data.

In the three-dimensional face discriminating process at step S158 in FIG. 11, two-dimensional feature data of an object (two-dimensional feature data of something like a face) is calculated from image data in the area of each obtained frame image data where it is determined something like a face is found.

When it is determined at step S66 that a coinciding portion of a degree of similarity larger than a predetermined value is found, CPU 10 advances to step S67 to determine that the registered face is found in the coinciding portion of a degree of similarity larger than a predetermined value, thereby detecting a face area. When it is determined at step S67 that an angle set currently is the angle set last, CPU 10 advances to step S70 to determine that the registered face has not been found.

When the face area has been detected at step S67, it is determined that a face has been discriminated at step S38 in FIG. 5, at step S161 in FIG. 11, and it is determined that a face has been discriminated at step S12 in FIG. 3, at step S21 in FIG. 4, and at step S109 in FIG. 9. When a face has not been detected at step S70, it is determined that a face has not been discriminated at step S39 in FIG. 5, at step S162 in FIG. 11, and when the face area has not been found at step S70, it is determined that a face has not been discriminated at step S39 in FIG. 5 and at step S162 in FIG. 11, and it is determined that a face has not been discriminated at step S12 in FIG. 3, at step S21 in FIG. 4, and at step S109 in FIG. 9.

It is possible to detect a face in the three-dimensional face discriminating process. In the three-dimensional face discriminating process, when the registered face has been found in frame image data, it is determined that a face has been detected. Further, even if it is determined that the registered face has not been found in frame image data, the two-dimensional feature data of an object calculated at step S64 is compared with the face feature data calculated at step S63, whereby a human face other than the registered human face can be detected. For example, when a portion of the obtained image that coincides with the face feature data calculated at step S63 with a degree of similarity larger than a first value has been found, it is determined that the image is a face of a person corresponding to the three-dimensional face data from which the face feature data is produced, and when the portion of the obtained image does not coincide with the face feature data calculated at step S63 with a degree of similarity larger than the first value, but coincides with the face feature data with a degree of similarity larger than a second value (the second value is smaller than the first value), it is determined that the image is a face.

H-3. Three-Dimensional Face Discriminating Operation Based on other Method

The first three-dimensional face discriminating process is substantially the same as the process described in "H-2". In the process of "H-2", two-dimensional image data of an object seen from a different angle is produced from the three-dimensional face data, but in the present process, two-dimensional image data of an object of different facial expression (laugh, anger, hate) is produced from the three-dimensional face data. In the present process, two-dimensional image data of an object facing the front is produced.

The first three-dimensional face discriminating operation will be described with reference to FIG. 8.

A facial expression of an object is set dead at step S61. The facial expression of the three-dimensional face data corresponding to the sort of the face discriminating mode set currently is confirmed at step S62. Three-dimensional face data of an object of the facial expression set previously is produced from the confirmed three-dimensional face data. Then, two-dimensional face data of an object seen from the front is produced from the produced three-dimensional face data.

When it is determined at step S66 that a coinciding portion of a degree of similarity larger than a predetermined value has been found in an obtained image data, it is determined at step S67 that the registered face is found in the coinciding portion of the image data, and a face area is detected. Meanwhile, when it is determined at step S66 that the coinciding portion of a degree of similarity larger than a predetermined value has not been found in the obtained image data, it is judged at step S68 whether or not the set facial expression is the last one. That is, it is judged whether or not all the predetermined facial expressions have been set. When it is determined at step S68 that the set facial expression is not the last one, CPU 10 sets the following facial expression at step S62, and returns to step S62. Meanwhile, when it is determined at step S68 that the set facial expression is the last one, CPU 10 advances to step S70 to determined that the registered face is not found in the obtained image data.

As described above, the accuracy of recognizing a face is enhanced. For example, even if an object (person) is laughing or angry, his or her face can be discriminated.

In the face discriminating process of "H-3", in place of two-dimensional image data of a person facing in the other direction, two-dimensional image data of the person showing other facial expression is produced from three-dimensional face data, but two-dimensional image data may be produced of the person who faces in various directions every time he or she changes his or her facial expression. That is, two-dimensional image data of the person may be produced, wherein the person changes his or her expression every time he or she faces in the different direction.

The three-dimensional face discriminating process is described above, but this three-dimensional face discriminating process may be applied to the three-dimensional face detecting process. Modification may be made such that a face is detected in the three-dimensional face discriminating process.

Operation in the second three-dimensional face discriminating process is a combination of operations described in "H-1" and "H-2". In the operation of "H-1", two-dimensional image data of an object seen from a different angle is produced from the three-dimensional face data registered in the face data table, but in the second three-dimensional face discriminating process, three-dimensional model of an object is produced from plural pieces of obtained frame image data, and further two-dimensional image data of an object seen from a different angle is produced from the produced three-dimensional model of an object. For the second three-dimensional face discriminating process, with respect to every object only two-dimensional face data is recorded in the face data table for face discrimination.

Operation in the second three-dimensional face discriminating process will be described with reference to the flow charts of FIGS. 6 and 8.

Figure 6:
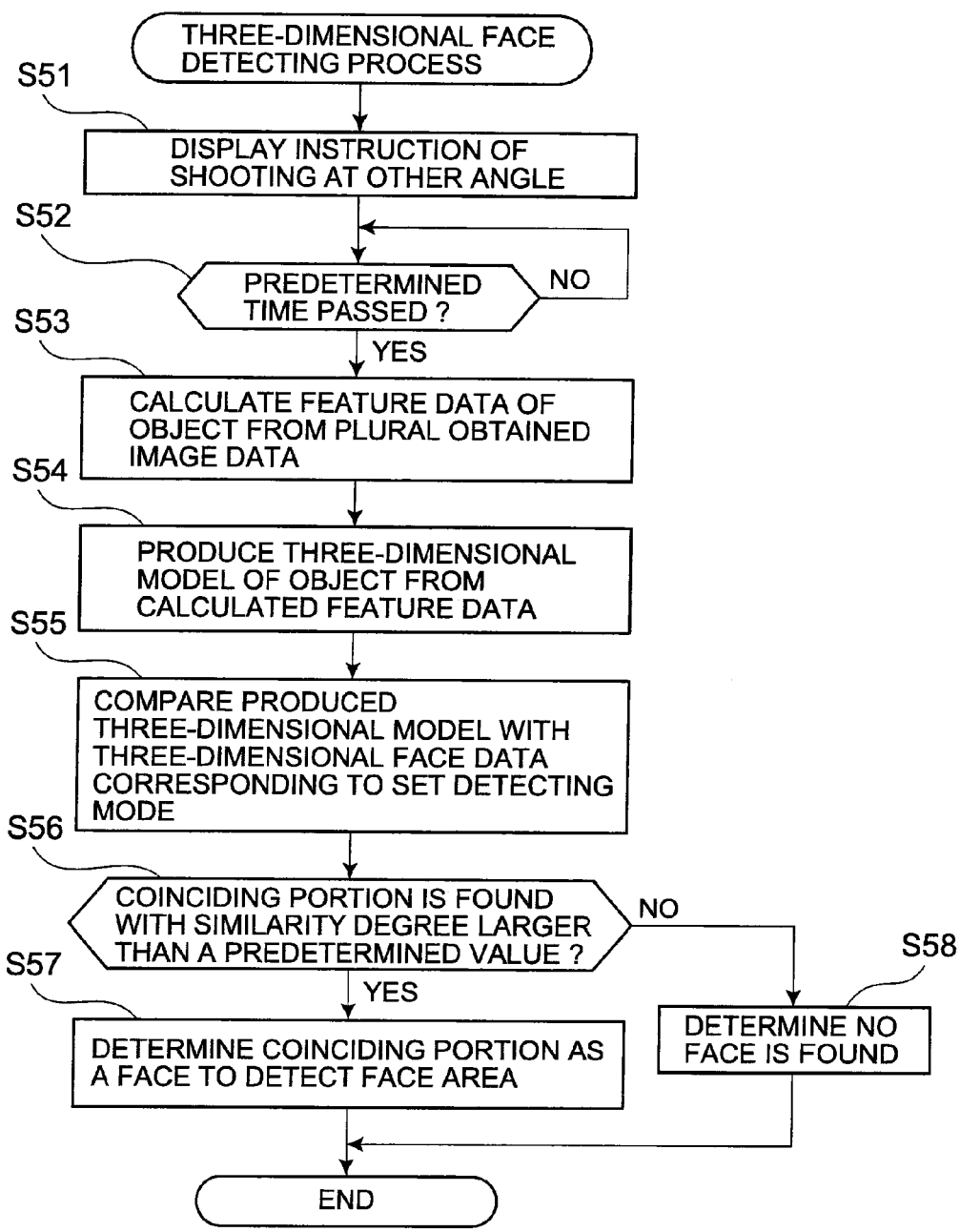
FIG. 6 is a flow chart of operation in the first three-dimensional face detecting process.

After the process is performed at steps S51 or S52 in FIG. 6, feature data of an object is calculated for each of plural pieces of frame image data of an object shot from different angles at step S53, and a three-dimensional model of an object is produced from the feature data of an object calculated for each piece of frame image data at step S54.

Figure 8:
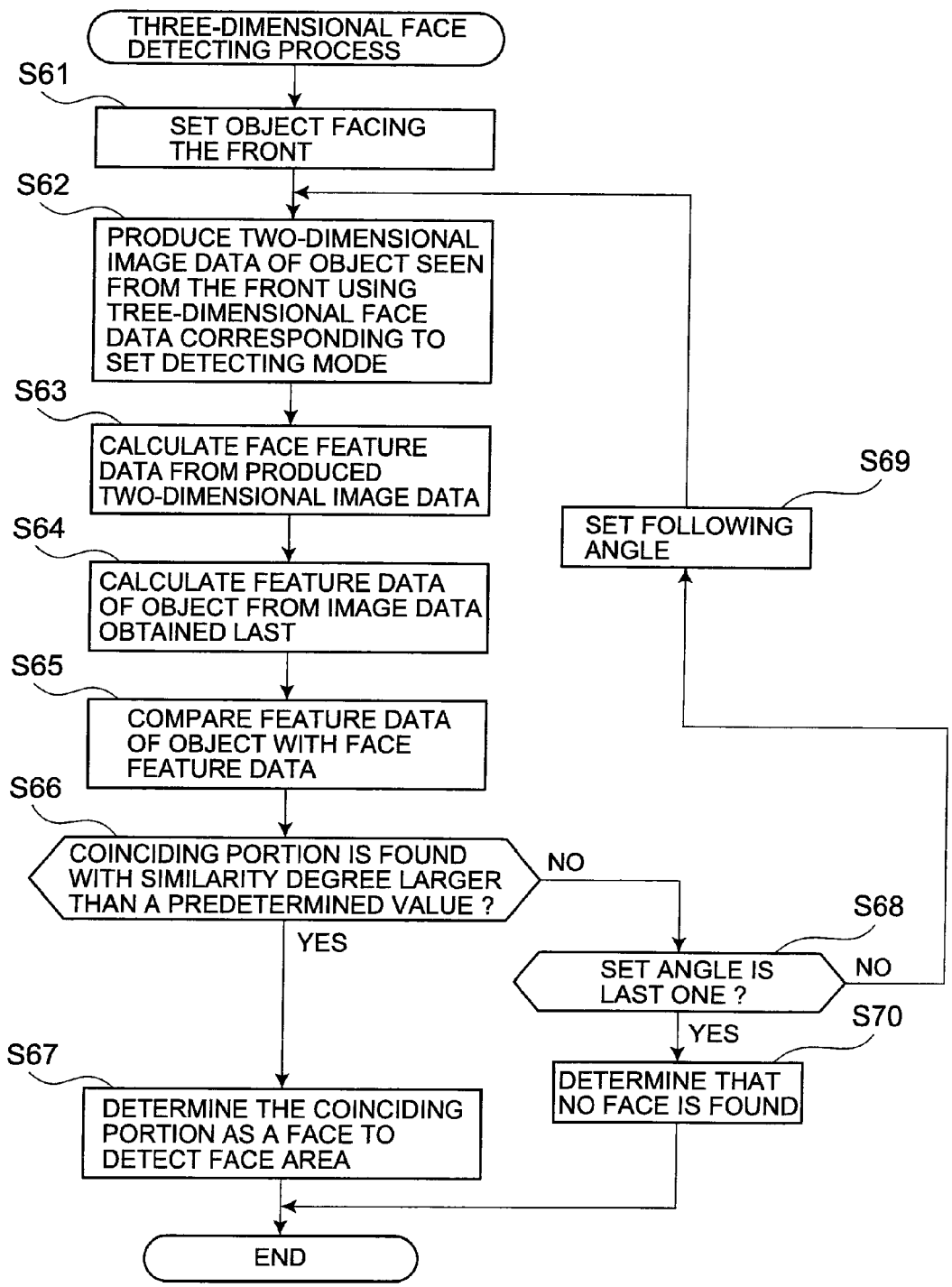
FIG. 8 is a flow chart of operation in the second three-dimensional face detecting process.

The object is set to face the front at step S61 in FIG. 8. Two-dimensional image data of the object seen from the set angle is produced from the produced three-dimensional model of the object at step S62. Feature data of the object is calculated from the produced two-dimensional image data at step S63. The calculated feature data of the object (Feature data of the object seen from the set angle) is compared at step S65 with the two-dimensional face data prepared for the currently set face discriminating mode and registered in the face data table for face recognition.

When it is determined at step S66 that a portion (coinciding portion) which coincides with the registered two-dimensional face data with a degree of similarity larger than a predetermined value is found in the feature data of the object, it is determined at step S67 that the registered face is found in the coinciding portion of a degree of similarity larger than a predetermined value, and a face area is detected. Meanwhile, when it is determined at step S66 that the coinciding portion of a degree of similarity larger than a predetermined value is not found in the feature data of the object, it is judged at step S68 whether or not the currently set angle is the angle set last. When it is determined at step S68 that the currently set angle is not the angle set last, the object is set to face the different angle (following angle) at step S69. When it is determined at step S68 that the currently set angle is the angle set last, then it is determined at step S70 that the registered face has not been found in the feature data of the object.

The above process enhances the accuracy of discriminating a face. For example, even if the person faces aside or wears sunglasses, it is possible to tell if the person is the person registered in the face data table. In place of three-dimensional face data, two-dimensional face data is registered in the memory, resulting in reducing a recording volume of the memory.

The three-dimensional face discriminating process is described above, and this three-dimensional face discriminating process can be used as the three-dimensional face detecting process. It is possible to detect a face in the second three-dimensional face discriminating process.

In the three-dimensional face discriminating process at step S156 in FIG. 11, a three-dimensional model of an object is produced from the image data in the face area, and therefore a three-dimensional model of a face is produced. When the three-dimensional model of a face is produced, it is possible to change a facial expression of the three-dimensional model of a face, by confirming the face of the produced three-dimensional model of a face. Operation in the three-dimensional face discriminating process is described above, and this three-dimensional face discriminating process can be used as three-dimensional face detecting process. The three-dimensional face discriminating process may be used to detect a face in place of a three-dimensional face detecting process.

In the third embodiment of the invention, an appropriate face discriminating process is performed depending on the sort of the face discriminating mode, and therefore, an appropriate two-dimensional face discriminating process is performed depending on the sort of an object and/or shooting circumstance and the accuracy of discriminating a face is enhanced.

In the third embodiment of the invention, the two-dimensional face discriminating process and three-dimensional face discriminating process corresponding to the sort of the set face discriminating mode are performed, and therefore an unnecessary three-dimensional face discriminating process of a heavy process load is not performed and the accuracy of discriminating a face is enhanced. For example, a face of a person is somewhat flat, and therefore the two-dimensional face discriminating process is performed. An animal (dog, cat) has a three-dimensional head or face, and therefore it is difficult to discriminate a face in the two-dimensional face discriminating process, but the three-dimensional face discriminating process can discriminate a face of an animal.

When a human face is not discriminated in the two-dimensional face discriminating process, the three-dimensional face discriminating process is performed to discriminate a human face. Therefore, even if a person faces aside and/or wears a mask or sunglasses, his or her face can be discriminated in the three-dimensional face discriminating process.

When the user sets the face discriminating mode, only a face of a person who the user wants to discriminate can be discriminated.

When the face discriminating mode is automatically set, the user is not required to perform troublesome operation. If a sort of an object (dog or fox) to be shot is not clearly specified, a face of the object can be discriminated, and the accuracy of discriminating a face is enhanced.

In the case where the object following mode is set ON, when the two-dimensional face discriminating process and three-dimensional face discriminating process corresponding to the sort of the set face discriminating mode are performed to discriminate a face. When the face is discriminated, the discriminated face is detected in the two-dimensional face detecting process. When the face to be followed is lost, the two-dimensional face discriminating process and three-dimensional face discriminating process corresponding to the sort of the set face discriminating mode are performed again. Therefore, a process load in the object following process is reduced and the accuracy of following an object is enhanced.

Modifications to the Embodiments of the Invention

Modifications may be made to the embodiments described above

(01) In the above embodiments, whether the object following mode is set OFF or ON, the face detecting process and face discriminating process corresponding to the face discriminating mode are performed. But modification may be made such that, when the object following mode is set ON, the three-dimensional face detecting process and the three-dimensional face discriminating process are performed independently of the sort of the set face detecting mode, and the face detected in the three-dimensional face detecting process and the face discriminated in the three-dimensional face discriminating process are two-dimensionally detected, whereby the detected face is subjected to the object following process. When the object is lost before the shutter button is pressed full way, the three-dimensional face detecting process and three-dimensional face discriminating process are performed again.

(02) In the above embodiments, regarding the face detecting process corresponding to the sort of the face detecting mode set at steps S10 in FIG. 3 and S108 in FIG. 9, when the human face detecting mode is set, the two-dimensional face detecting process and two-dimensional face discriminating process are performed (step S32 in FIG. 5, step S152 and step S154 in FIG. 11), and when a face has not been detected in the two-dimensional face detecting process and two-dimensional face discriminating process (NO at step S33 in FIG. 5, and NO at steps S153 and S155 in FIG. 11), the three-dimensional face detecting process is performed for the first time (steps S35 and S36 in FIG. 5, steps S156, S158 and S159 in FIG. 11). The three-dimensional face detecting process and three-dimensional face discriminating process may be omitted. In this case, when it is determined that the human face and the registered human face have not been found at step S33 in FIG. 5, and at steps S153 and S155, CPU 10 advances to step S39 in FIG. 5 and to step S162 in FIG. 11. In this case, operations to be performed at steps S34 and S35 in FIG. 5, and at steps S156 to S158 in FIG. 11 are omitted.

(03) In the above embodiments, the face detecting process and face discriminating process corresponding to the face detecting mode set at step S10 in FIG. 3 and at step S108 in FIG. 9, that is, when the face detecting mode for detecting an animal face (dog face, cat face etc.) and the face discriminating mode for recognizing an animal face are set, an animal face set in the face detecting mode is detected and discriminated without exception in the three-dimensional face detecting process and three-dimensional face discriminating process (step S36 in FIG. 5 and S159 in FIG. 11). But when an animal face detecting mode and animal face discriminating mode are set, the same operation may be performed as in the human face detecting mode and human face discriminating mode. That is, the two-dimensional face detecting process corresponding to the sort of the set animal face detecting mode may be performed or only three-dimensional face discriminating process corresponding to the sort of the set animal face discriminating mode may be performed. For example, when a cat face detecting mode is set, the same process is performed as in the human face detecting mode, and when a dog face detecting mode is set, only the three-dimensional face detecting process is performed. This is because all the faces of animals are not always three-dimensional, and some animals have somewhat a two-dimensional face. In the case where the two-dimensional face detecting process is performed, when a face of an animal specified for the face detecting mode has not been detected, the three-dimensional face detecting process may be performed, or is not performed. In this case, in the face data table of FIG. 2 are registered two-dimensional face data and three-dimensional face data of each animal. The accuracy of recognizing a face is enhanced.

(04) In the above embodiments, the two-dimensional face detecting process and two-dimensional face discriminating process are performed on the whole area of image data at step S32 in FIG. 5, and the three-dimensional face detecting process and three-dimensional face discriminating process are performed on the whole area of image data at step S36 in FIG. 5, and the two-dimensional face detecting process is performed on the whole area of image data at step S152 in FIG. 11, and the three-dimensional face discriminating process is performed on the whole area of image data at step S159 in FIG. 11. It is not always necessary for these process to be performed on the whole area of image data but these processes may be performed on the central area of a field angle or on area that the user designates, thereby reducing load of face detecting process and face discriminating process.

Color components associated with the sorts of the face detecting modes and color components associated with the sorts of the face discriminating modes are recorded. Modification may be made such that the processes is performed not on the whole area of image data but only on areas including the color components associated with the sorts of the currently set face detecting mode and face discriminating mode. Color components associated with the sorts of the face detecting modes and the sorts of the face discriminating modes are color components of a face to be detected in the appropriate face detecting mode or color components of a face to be discriminated in the appropriate face discriminating mode. For example, the color component is skin tone in the human face detecting mode. As described, the face detecting process and face discriminating process can be performed only on an area where the face of the object is found in the set face detecting mode or in the set face discriminating mode. Process load is reduced.

(05) In the above embodiments, feature points of the object and/or feature points of the species of the object are extracted to obtain feature data, and a three-dimensional model is produced from the feature data, and the obtained feature data is compared with the registered face data to detect and discriminate a face. But it may be possible to produce a three-dimensional model, and detect and discriminate a face using other method.

Further, a three-dimensional model of an object is produced from plural pieces of image data, but it may be possible to produce a three-dimensional model of an object from a single piece of image data.

(06) In the above embodiments, only still image data obtained in the still image shooting process is recorded, but it may be possible to associate various items with the still image data, such as a position of a face and a sort of a face (a sort of the set face detecting mode) detected in the face detecting process, the position of a face and name (person's name, pet's name etc.) discriminated in the face discriminating, and to record them in the memory.

(07) In the above embodiments, AF process is perform on the detected face and discriminated face, but an exposure may be controlled based on the detected face and discriminated face, and a predetermined process including a trimming process may be performed based on the detected face and discriminated face.

(08) In the above embodiments, three-dimensional face data and two-dimensional face data of each sort of object (person, dog, cat etc.) are registered in the face data table, but the sorts of the objects are separated into detailed classifications, and the three-dimensional face data and two-dimensional face data of each detailed classification of objects (for example, Shiba inu, Akita inu, Japanese originating dogs, Persian cat, calico cat etc.) may be registered in the face data table. Detailed classification of the objects enhances accuracy of face detecting or discriminating operation.

(09) With respect each sort of objects, a single piece of two-dimensional face data and a single piece of three-dimensional face data are registered in the face data table shown in FIG. 2, but plural pieces of two-dimensional face data and plural pieces of three-dimensional face data may be registered for one sort of object in the face data table. Taking a cat as an example, cat's face can greatly vary according to the species of the cat. Therefore, plural pieces of three-dimensional data are recorded such that every face of cats can be detected.

(10) In the above embodiments, one face detecting mode and one face discriminating mode (collectively referred to as "face recognizing mode") are set, but plural face detecting modes and plural face discriminating modes may be set at the same time and all the faces corresponding respectively to these modes are detected. Operation is performed in different ways depending on these modes (refer to FIGS. 5 and 11). And therefore, these face detecting modes and face discriminating modes are set at the same time to the extent that does not change the operation.

(11) In the above embodiments, the human face recognizing mode and animal face recognizing mode are prepared. But other face recognizing modes may be prepared in addition to those described in the embodiments. For example, face recognizing modes for insects (beetles, stag beetles) may be prepared, a face recognizing mode for each insect such as a face recognizing mode for beetles and a face recognizing mode for stag beetles may be prepared.

(12) In the operation (FIG. 5) in the first and second embodiments, when a human face has not been detected in the two-dimensional face detecting process (NO at step S33), the three-dimensional face detecting process is performed at steps S35 and S36. But modification may be made such that only when it is determined at step S34 something like a face has been found, the three-dimensional face detecting process is performed. That is, when it is determined at step S34 that something like a face has been found, CPU 10 advances directly to step S39. In this case, the process at step S36 is omitted.

(13) In the operation (FIG. 5) in the third embodiment, when a human face has not been detected in the two-dimensional face detecting process (NO at step S153), it is judged at step S157 whether or not something like a face has been found. When something like a face has been found at step S157, then the three-dimensional face detecting process is performed on an area where something like a face is found at step S158. When something like a face has not been found, then the three-dimensional face detecting process is performed on the whole area of the image data at step S159. But when something like a face has not been found at step S157, CPU 10 may advances directly to step S162.

In the above embodiments, when a face part of the face data has not been detected, it is determined that something like a face has been found. It is not always determined definitely whether or not a face part has been found in the face data. For example, there is a case that a face part "nose" is found with probability 30% and a face part "mouth" is found with probability 60%. In this case, it is not determined that a face is found, depending on whether or not a particular face part is found, but it may be determined that no face is found when plural parts are found with the average probability of less than 10%, and it may be determined that something like a face is found, when plural face parts are found with probability of 10% to 60%, and it may be determined that a face is found, when plural face parts are found with probability of larger than 60%.

(14) The present invention is characterized in that the face recognizing operation is selected depending on the face recognizing mode (face detecting mode and face discriminating mode are collectively referred to as face recognizing mode). In the above embodiments, the face recognizing mode is set for each sort of the object, but it is not always necessary to prepare the face recognizing mode for each sort of the object.

For example, the face recognizing mode may be separated depending on the dimension of image data, that is, into two-dimensional face recognizing mode and three-dimensional face recognizing mode, wherein the two-dimensional face recognizing process is performed to recognize a face in the two-dimensional face recognizing mode and the three-dimensional face recognizing process is performed to recognize a face in the three-dimensional face recognizing mode. In the case of recognizing a human face, the two-dimensional mode is set at first to perform the face recognizing process, and when a face has not been recognized, then the three-dimensional face recognizing mode may be set.

In the case of recognizing an animal face, the three-dimensional face recognizing mode may be set from the very first, and the two-dimensional face recognizing mode may be set and three-dimensional face recognizing mode may be set depending on the sort of the animal. In this case, the two-dimensional face recognizing mode has been set, and when a face has not been recognized in the two-dimensional face recognizing mode, then the three-dimensional face recognizing mode may be set.

Further, a face recognizing mode may be prepared depending on the sort of the object and the dimension of face recognition.

For example, in the above embodiments, in the human face recognizing mode, two-dimensional face recognizing process and three-dimensional face recognizing process are performed. A face recognizing mode may be prepared for each combination of the sort of the object and dimension of face recognition. That is, a two-dimensional human face recognizing mode for recognizing a human face in the two-dimensional human face recognizing process, and a three-dimensional human face recognizing mode for recognizing a human face in the three-dimensional human face recognizing process are prepared.

For example, modification may be made such that, when the two-dimensional face recognizing mode has been set, an appropriate face recognizing process is performed, and when a face has not been detected, three-dimensional human face recognizing mode is automatically set to perform a human face recognizing process. In the case of recognizing a human face, the two-dimensional human face recognizing mode may be set at first.

In the case of recognizing a face of an animal (cat), when there are prepared two modes, that is, a two-dimensional face recognizing mode and a three-dimensional face recognizing mode, the two-dimensional face recognizing mode is set at first to recognize a face, and when a face has not been recognized, then the three-dimensional face recognizing mode may be set to recognize a face.

It may be possible to consider that the object following mode is one of the face recognizing modes (face following/recognizing mode). For example, at step S22 in FIG. 4, and at step S121 in FIG. 10, the face following/recognizing mode is switched to perform a face recognizing process corresponding to the set face following/recognizing mode. In other words, the face recognized last at step S10 in FIG. 3 and S108 in FIG. 9 is two-dimensionally detected to follow the face. When the face to be followed has been lost at step S24 in FIG. 4 and at step S123 in FIG. 9, thee face recognizing mode that was set just before the face following/recognizing mode is set is set again, CPU returns to step S10 in FIG. 3 and step S108 in FIG. 9.

(15) The above modifications (01) to (14) may be arbitrarily combined.

(16) The above embodiments describe by way of example preferred embodiments of the invention for better understanding of the principle, structures, operation of the invention, and shall not be interpreted to limit the scope of claims.

Various modifications and/or alternations made to the embodiments shall fall within the scope of claims and shall be interpreted to be protected thereunder.

In the above embodiments, the image pick-up apparatus which is adopted in the digital camera 1 is described, but can be used in any apparatus for recognizing a face in the obtained image data.

What is claimed is:

1. An image pickup apparatus having an object recognition function, the apparatus comprising:
    an image pickup unit;
    a processing unit for performing a predetermined processing on a face portion in image data obtained by the image pickup unit;
    a personal information storing unit for storing personal information regarding a face of a person;
    a control unit for selectively controlling the processing unit to perform the predetermined processing on one of (i) a face portion of an unspecified person and (ii) a face portion identified as a face of a specific person which is stored in the personal information storing unit;
    a face recognition mode setting unit for setting any one of face recognition modes each having a different face recognition processing to be performed when a face of an object is recognized;
    a face detection unit for carrying out face detection processing for detecting a face of a person regardless of whether or not the person is an unspecified person whose personal information is not stored in the personal information storing unit; and
    a face identifying unit for carrying out face identifying processing in which a face of a specified person is identified based on personal information stored in the personal information storing unit;
    wherein (i) when a face identifying mode is set, the control unit controls the processing unit to perform the predetermined processing on a face of a specified person identified by the face identifying unit, and (ii) when a face detection mode is set, the control unit controls the processing unit to perform the predetermined processing on a face of an unspecified person detected by the face detection unit.

2. The image pickup apparatus according to claim 1, further comprising a personal information registering unit for adding personal information regarding a person's face to the personal information storing unit for registration.

3. The image pickup apparatus according to claim 1, wherein the predetermined processing is any one of auto-focus processing, exposure control, and trimming processing which are to be performed on the face portion.

4. The image pickup apparatus according to claim 1, wherein:
    when the face identifying mode is set, the control unit controls the face identifying unit to perform the face identifying processing on a face of a detected person, after a face of a person is detected in the face detection processing, and
    when the face detection mode is set, the control unit controls the processing unit to perform the predetermined processing without the face identifying unit carrying out the face identifying processing, after a face of a person is detected in the face detection processing.

5. The image pickup apparatus according to claim 1, wherein the face recognition mode setting unit automatically sets a face recognition mode based on image data obtained by the image pickup unit.

6. The image pickup apparatus according to claim 1, wherein the face recognition mode setting unit sets a face recognition mode in accordance with a user operation.

7. The image pickup apparatus according to claim 6, wherein the face recognition mode setting unit carries out the face recognition processing based on the face recognition mode set in accordance with the user operation and then, in response to a result of the face recognition processing, sets another face recognition mode.

8. The image pickup apparatus according to claim 1, wherein the face recognition mode setting unit sets one of a plurality of face recognition modes and the control unit controls the processing unit to carry out the face recognition processing based on the set one face recognition mode.

9. The image pickup apparatus according to claim 1, wherein the face recognition mode setting unit simultaneously sets a plurality of face recognition modes and the control unit controls the processing unit to carry out all of the plurality of set face recognition modes.

10. A face recognition method performed under control of a computer having an image pickup unit and a personal information storing unit for storing personal information regarding a face of an individual, the method comprising:

setting any one of face recognition modes each having a different face recognition processing to be performed when a face of an object is recognized; and selecting whether a predetermined processing, which is to be performed on a face portion in image data obtained by the image pickup unit, is to be performed on one of (i) a face portion of an unspecified person, and (ii) a face portion identified as a face of a specified person stored in the personal information storing unit;

wherein:

when a face detection mode is set, the selecting selects to perform the predetermined processing on a face of an unspecified person which is detected by carrying out face detection processing for detecting a face of a person regardless of whether or not the person is an unspecified person whose personal information is not stored in the personal information storing unit; and when a face identifying mode is set, the selecting selects to perform the predetermined processing on a face of a specified person which is identified by carrying out face identifying processing in which a face of a specified person is identified based on personal information stored in the personal information storing unit.

11. A non-transitory computer readable recording medium having a program stored thereon which controls a computer to execute functions comprising:

setting any one of face recognition modes each having a different face recognition processing to be performed when a face of an object is recognized; and selecting whether a predetermined processing, which is to be performed on a face portion in image data obtained by an image pickup unit, is to be performed on one of (i) a face portion of an unspecified person, and (ii) a face portion identified as a face of a specified person stored in a personal information storing unit;

wherein:

when a face detection mode is set, the selecting selects to perform the predetermined processing on a face of an unspecified person which is detected by carrying out face detection processing for detecting a face of a person regardless of whether or not the person is an unspecified person whose personal information is not stored in the personal information storing unit; and when a face identifying mode is set, the selecting selects to perform the predetermined processing on a face of a specified person which is identified by carrying out face identifying processing in which a face of a specified person is identified based on personal information stored in the personal information storing unit.

* * * * *